United States Patent
Makino et al.

(10) Patent No.: US 9,316,834 B2
(45) Date of Patent: Apr. 19, 2016

(54) HEAD-MOUNTED DISPLAY DEVICE WITH FOVEATED PIXELS

(71) Applicant: PANASONIC CORPORATION, Osaka (JP)

(72) Inventors: Hiroyasu Makino, Osaka (JP); Yusuke Takata, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/359,547

(22) PCT Filed: Nov. 22, 2012

(86) PCT No.: PCT/JP2012/007537
§ 371 (c)(1),
(2) Date: May 20, 2014

(87) PCT Pub. No.: WO2013/076994
PCT Pub. Date: May 30, 2013

(65) Prior Publication Data
US 2014/0266990 A1    Sep. 18, 2014

(30) Foreign Application Priority Data

Nov. 24, 2011 (JP) .................................. 2011-255847
Nov. 29, 2011 (JP) .................................. 2011-259862

(51) Int. Cl.
*G02B 27/01* (2006.01)

(52) U.S. Cl.
CPC .......... *G02B 27/0172* (2013.01); *G02B 27/017* (2013.01); *G02B 27/0176* (2013.01);
(Continued)

(58) Field of Classification Search
CPC ............. G02B 27/017; G02B 27/0172; G02B 27/0176; G02B 2027/0174; G02B 2027/0178
See application file for complete search history.

(56) References Cited

U.S. PATENT DOCUMENTS 4,449,792 A    5/1984   Arai et al.
4,831,368 A *  5/1989   Masimo et al. ................. 345/27
(Continued)

FOREIGN PATENT DOCUMENTS

JP    60-500077 A    1/1985
JP    02-281891 A    11/1990
(Continued)

OTHER PUBLICATIONS

C. Tani, "Highly Realistic Display," Kyoritsu Shuppan Co., Ltd., 2001, pp. 61-62, with partial English translation.
(Continued)

*Primary Examiner* — Gene W Lee
(74) *Attorney, Agent, or Firm* — McDermott Will & Emery LLP

(57) ABSTRACT

A head-mounted display device having: an image display element displaying a two-dimensional image; an eyepiece magnifying and projecting the image displayed by the image display element; and a holder holding the image display element and the eyepiece, so that the viewer's eyeball sees, through the eyepiece, a magnified virtual image of the image displayed by the image display element. The image display element is a two-dimensional display device having the shape of a matrix, composed of a central portion which is flat, and a left side portion and a right side portion each of which has a sheet-like shape whose cross-section along a horizontal plane is curved toward the eyepiece away from the extension line of the central portion. In the image display element, pixels in the left and right side portions and are greater in size than pixels in the central portion.

19 Claims, 13 Drawing Sheets

(52) U.S. Cl.
    CPC . *G02B2027/0123* (2013.01); *G02B 2027/0156* (2013.01); *G02B 2027/0161* (2013.01); *G02B 2027/0178* (2013.01)

(56) References Cited

U.S. PATENT DOCUMENTS

| | | | |
|---|---|---|---|
| 5,034,809 A | | 7/1991 | Katoh |
| 5,572,343 A | * | 11/1996 | Okamura ............ G02B 27/017 345/8 |
| 7,486,341 B2 | | 2/2009 | Hong et al. |
| 7,495,638 B2 | * | 2/2009 | Lamvik ............ G02B 27/0172 345/76 |
| 2002/0181115 A1 | | 12/2002 | Massof et al. |
| 2002/0186347 A1 | * | 12/2002 | Okamoto ........... G02B 27/0172 351/211 |
| 2003/0058543 A1 | * | 3/2003 | Sheedy et al. ................ 359/630 |
| 2003/0071795 A1 | * | 4/2003 | Baldauf et al. ............... 345/173 |
| 2004/0070839 A1 | * | 4/2004 | Yagi et al. ...................... 359/630 |
| 2004/0227703 A1 | | 11/2004 | Lamvik et al. |
| 2005/0078057 A1 | * | 4/2005 | Chang et al. ..................... 345/55 |
| 2005/0088079 A1 | * | 4/2005 | Daniels ......................... 313/504 |
| 2005/0195491 A1 | | 9/2005 | Bernard et al. |
| 2007/0225096 A1 | * | 9/2007 | Fujita ............................ 474/202 |
| 2007/0278933 A1 | * | 12/2007 | Chao et al. ..................... 313/500 |
| 2008/0239499 A1 | | 10/2008 | Fukuda |
| 2009/0160872 A1 | | 6/2009 | Gibbons |
| 2010/0309150 A1 | * | 12/2010 | Lee et al. ....................... 345/173 |

FOREIGN PATENT DOCUMENTS

| | | |
|---|---|---|
| JP | 4-042650 B2 | 7/1992 |
| JP | 04-336515 A | 11/1992 |
| JP | 06-282245 A | 10/1994 |
| JP | 07-072420 A | 3/1995 |
| JP | 7-128612 A | 5/1995 |
| JP | 07-255022 A | 10/1995 |
| JP | 2000-284216 A | 10/2000 |
| JP | 2001-13450 A | 1/2001 |
| JP | 2001-282133 A | 10/2001 |
| JP | 3304497 B2 | 7/2002 |
| JP | 2002-228972 A | 8/2002 |
| JP | 2003-162236 A | 6/2003 |
| JP | 2004-056335 A | 2/2004 |
| JP | 2005-182005 A | 7/2005 |
| JP | 2005-250478 A | 9/2005 |
| JP | 2005-323000 A | 11/2005 |
| JP | 2007-086500 A | 4/2007 |
| JP | 2007-94089 A | 4/2007 |
| JP | 2008-111890 A | 5/2008 |
| JP | 2009-211049 A | 9/2009 |
| JP | 2011-145488 A | 7/2011 |
| WO | 84/01680 A1 | 4/1984 |

OTHER PUBLICATIONS

"Human Measurement Handbook," Institute for Human Science & Biomedical Engineering, National Institute of Advanced Industrial Science and Technology, Asakura Publishing Co., Ltd, 2003, p. 169, with partial English translation.

International Search Report issued in International Application No. PCT/JP2012/007537 mailed Feb. 12, 2013, with English translation, 7 pgs.

Corrected Version of International Search Report issued in International Application No. PCT/JP2012/007537 mailed Feb. 27, 2014, 4 pgs.

Chinese Office Action issued in Chinese Application No. 2012800570061 dated Nov. 6, 2015, with English Translation.

* cited by examiner

FIG. 5A  FIG. 5B  FIG. 5C
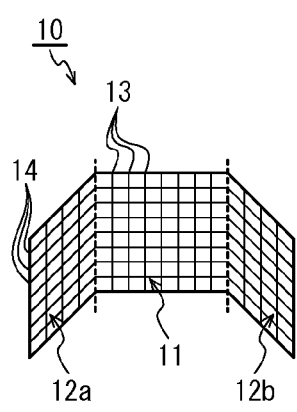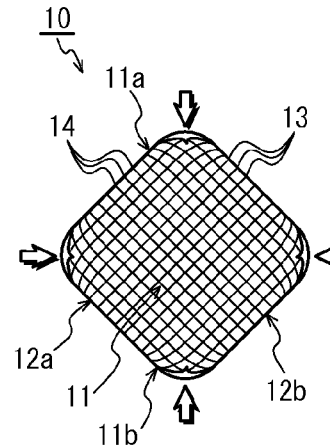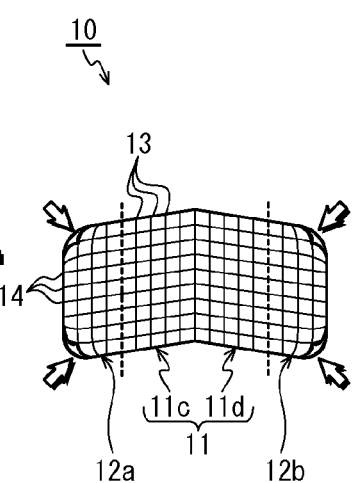
FIG. 5D  FIG. 5E
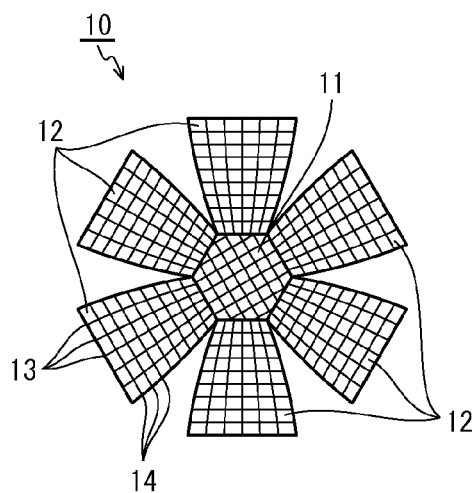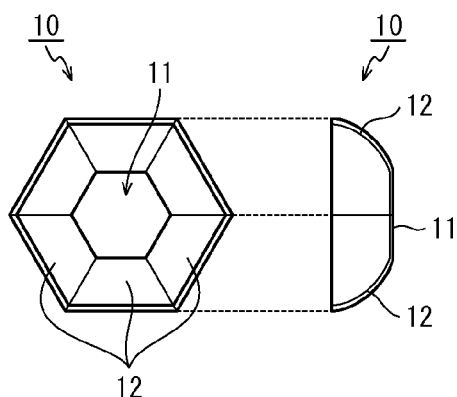

HEAD-MOUNTED DISPLAY DEVICE WITH FOVEATED PIXELS

RELATED APPLICATIONS

This application is the U.S. National Phase under 35 U.S.C. §371 of International Application No. PCT/JP2012/007537, filed on Nov. 22, 2012, which in turn claims the benefit of Japanese Application No. 2011-255847, filed on Nov. 24, 2011 and Japanese Application No. 2011-259862, filed Nov. 29, 2011, the disclosures of which are incorporated by reference herein.

TECHNICAL FIELD

The present invention relates to a head-mounted display device, and particularly to a head-mounted display device that holds a two-dimensional image display element and an eyepiece to the viewer's head and allows the viewer to see a magnified virtual image of an image displayed by the two-dimensional image display element.

BACKGROUND ART

In recent years, visual display devices equipped with a high-definition large screen are demanded as displays for televisions and computers. Consequently, display devices such as liquid crystal panels and plasma display panels are remarkably increasing in size.

The reason for this is, for example, a display needs to have a wider angle of view in order to present a more realistic image to the viewer. In quantitative terms, it is known that in order to create a realistic effect such as a stereoscopic effect, visual impact and so on, a display needs to have a horizontal view angle of at least 30° (i.e. ±15°, which denotes that a range of 15° extends from the center to each of the right and the left. The same applies to the following description), and this effect becomes saturated when the angle reaches approximately 120° (±60°).

Therefore, it is desirable that the angle of view is at least 30° and is preferably close to 120° as much as possible. However, to realize a horizontal view angle of 120°, a 200-inch large screen is required at two meters from the viewer, and it is difficult to install such a large screen in a usual living space.

The same is true to immersive displays developed for realizing virtual reality. Since an immersive display has a large display for encompassing the viewer, it is difficult to install an immersive display in a usual living space.

Considering the above, head-mounted display devices (HMDs) are now attracting attention. As disclosed in Patent Literature 1, a head-mounted display device is a small device, but it can provide a high-definition large image, and is applicable to virtual reality technology.

CITATION LIST

Patent Literature

[Patent Literature 1] Japanese Patent No. 3304497
[Patent Literature 2] Japanese Patent No. 04-42650

SUMMARY OF INVENTION

Technical Problem

A head-mounted display device needs to be small as a whole and lightweight in order to provide a better fit to the head (including the face).

To meet the need, it is commonly known that it is important to reduce the ocular optical system in size and weight by, specifically, reducing the number of the lenses. However, when the number of the lenses is small, a large optical aberration occurs in each lens, and it is difficult to correct the aberration, because of lack of lenses for the aberration correction. Consequently, it is difficult to realize a wide angle of view.

For example, as shown in FIG. 8, when an eyepiece 202 for magnifying an image displayed by a two-dimensional image display element 203 and projecting the image into the air is composed of a single lens, a large amount of distortion occurs, and coma, astigmatism and so on occur as well. Therefore, the angle of view is at most approximately 20°.

In order to widen the angle of view, it is possible to compose the optical system by using a single aspheric lens as an eyepiece as disclosed in Patent Literature 2.

The use of an aspheric lens as the eyepiece 202, as disclosed in Patent Literature 2, has an advantage that it can simplify the optical system and reduce the distortion and the coma. However, it is impossible to correct transverse chromatic aberration, or field curvature caused by Petzval sum. Practically, the angle of view is at most approximately 30°. In addition, in order to widen the angle of view, it is necessary to increase the size of the eyepiece 202, which consequently increases the size of the device as a whole and causes a bad fit.

Considering this problem, the device disclosed in Patent Literature 1 aims to correct the field curvature in a preferable manner. For this purpose, the device has an optical conversion element, which converts a planar image on the two-dimensional image display element to a curving image, and an eyepiece, which magnifies and projects the curving image so that a planar image is produced at a distance therefrom. In this device, as shown in FIG. 9, the optical conversion element converts the planar image on the two-dimensional image display element 305 to a curving image 303 so as to eliminate the field curvature. Therefore, the eyepiece 302 does not need to correct the field curvature, and corrects the astigmatism only. Thus, a flat enlarged image is formed in the air, with the angle of view of 50° (±25° in the horizontal direction and 63.1° in the diagonal direction.

According to Patent Literature 1, however, a relay lens system 304, an image fiber plate with a curved face, or the like is necessary as the optical conversion element for conversion to a curving image. This increases the size of the optical system, and accordingly increases the size of the device as a whole, and causes a bad fit. The use of an image fiber plate also has a problem of a low quality of the image.

Considering the above-described problems, the present invention aims to realize a small and lightweight head-mounted display device that allows the viewer to see an image with a wide angle of view no less than 30° (±15°.

Solution to Problem

To solve the problems described above, a head-mounted display device pertaining to one aspect of the present invention comprises: an image display element displaying an image; an eyepiece magnifying and projecting the image displayed by the image display element; and a holder holding the image display element and the eyepiece to a viewer's head, wherein the image display element is composed of: a central portion having a flat display surface; and a left side portion and a right side portion each being bent toward the eyepiece away from a plane extending along the central portion.

Here, when the central portion of the display surface of the two-dimensional image element is expressed as being "flat", it means that the central portion has a shape that is close to a flat surface not undergone a bending process, but may be warped to some extent.

SUMMARY OF INVENTION

In the display device described above, each of the left and right side portions of the display surface of the image display element is bent toward the eyepiece away from the plane extending along the central portion, and hence the left and right side portions correct the field curvature in the horizontal direction even when the number of lenses constituting the eyepiece is reduced. Therefore, it is possible to ensure an angle of view of at least 30° in the horizontal direction. Thus, the stated structure realizes a small, lightweight head-mounted display device with a wide angle of view.

Furthermore, since the central portion of the display surface of the image display element is flat, it is unnecessary to apply a bending process or the like to the central portion during the manufacturing of the image display element, and it is only necessary to apply a bending process or the like to the side portions. Therefore, the processing is easy compared to the case of applying the bending process to the entire image display element, and this leads to improvement in yield. Moreover, since the central portion of the display surface of the image display element is flat, it is relatively easy to form the central portion to be high-definition.

In addition, since the central portion of the display surface of the image display element has a narrow angle of view, the field curvature can be corrected by the eyepiece, even though the central portion is flat. Therefore, there is no problem in viewing the image.

BRIEF DESCRIPTION OF DRAWINGS

FIGS. 5A through 5E each show an image display element pertaining to an embodiment.

DESCRIPTION OF EMBODIMENTS

Aspects of Invention

<First Aspect>

Figure 1:
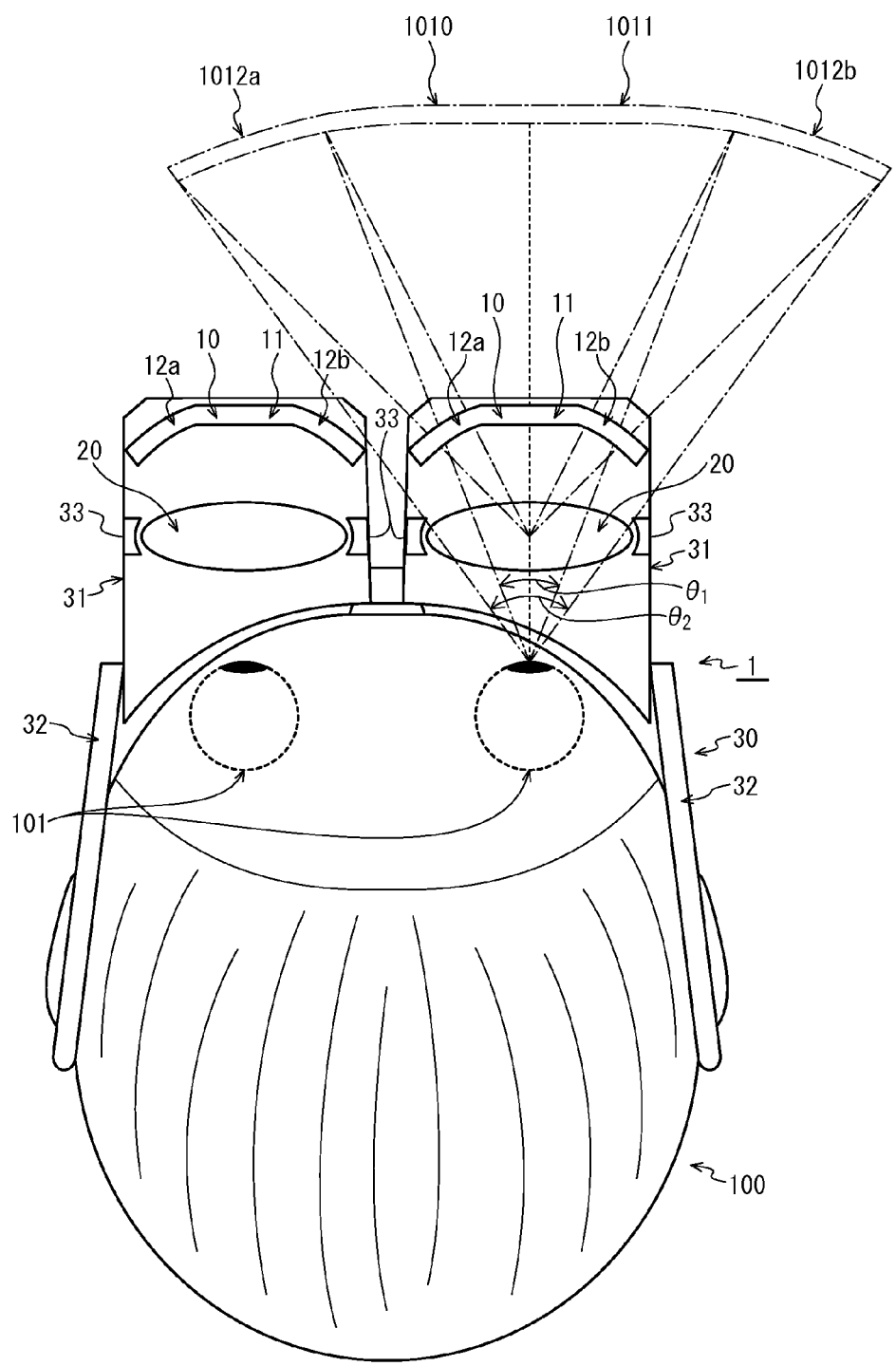
FIG. 1 shows the structure of a head-mounted display device 1 pertaining to Embodiment 1, and particularly shows the structure of an optical system.

To achieve the aim, a head-mounted display device comprises: an image display element displaying a two-dimensional image; an eyepiece magnifying and projecting the image displayed by the image display element; and a holder holding the image display element and the eyepiece to a viewer's head, wherein the image display element is composed of: a central portion having a flat display surface; and a left side portion and a right side portion each being bent toward the eyepiece away from a plane extending along the central portion.

This structure realizes a small, lightweight head-mounted display device with a wide angle of view. In addition, this device is readily processable in manufacturing, and thus improves the yield.

In the above-described image display element, the boundaries between the central portion and the left and right side portions are determined according to the practical angle of view of the eyepiece. For example, when a single aspheric lens is used, the boundaries are preferably set to match the angle of view of approximately 30° (±15°), and when a single spherical lens is used, the boundaries are preferably set to match the angle of view of approximately 20° (±10°).

Note, however, that the angle of view changes depending on the eye relief. Also, the boundaries between the central portion and the left and right side portions may vary for each product. Therefore, it is preferable that a boundary between the central portion and the left side portion and a boundary between the central portion and the right side portion are located within a range of 10° to 40° (±5° to)±20° in terms of an angle of view in a horizontal direction.

It is preferable that each of the left side portion and the right side portion has a sheet-like shape, and respective cross-sections thereof along a horizontal plane are curved.

For this reason, it is preferable that the image display element is formed by bending a flat sheet-like flexible display.

The image display element may have a rectangular sheet-like shape, and four corners of the image display element, which are located at top left, top right, bottom left and bottom right of the image display element, may be curved toward the eyepiece away from the plane extending along the central portion.

It is preferable to use a flexible organic EL element as an image display element, because a flexible organic EL element is readily bendable into a curved or angular shape.

The image display element may be made up from: a first display panel having a sheet-like shape and composed of a central portion and left and right side portion each bent toward the eyepiece away from the plane extending along the central portion; and a second display panel having a flat shape and being layered on the central portion of the first display panel.

If this is the case, the first display panel and the second display panel can be separately manufactured in the manufacturing process, and the image display element can be assembled from these panels. Therefore, this structure improves the yield. Optionally, it is possible to use a high-definition organic EL element composed of a flexible panel as the first display panel and a glass or silicon substrate as the second display panel.

If this is the case, it is preferable that the central portion of the first display panel is light-transmissive and the second display panel is disposed on the rear side of the first display panel.

The second display panel may display an image with a higher resolution than the left and right side portions of the first display panel. This structure reduces the amount of data to be processed during the driving, but is still capable of providing the viewer with a sense of seeing a high-definition image.

The eyepiece may be composed of a plurality of lenses, and the holder may hold at least one of the plurality of lenses detachably as a lens for correction of the visual acuity of the viewer.

To achieve the aim described above, the head-mounted display device may comprise: an image display element displaying a two-dimensional image; an eyepiece magnifying and projecting the image displayed by the image display element; and a holder holding the image display element and the eyepiece to a viewer's head, wherein the image display element may be composed of: a central portion having a flat display surface; and a peripheral portion being bent toward the eyepiece away from a plane extending along the central portion.

Pixels in the peripheral portion may be greater in size than pixels in the central portion.

<Second Aspect>

Head-mounted display devices additionally have the following problems.

Although it is possible to provide a wide angle of view by increasing the size of the image display element, a low image quality decreases the realism in viewing images. Therefore, it is necessary to increase the number of pixels in the image display element according to the increase in the angle of view to be provided. For example, a common HMD today has a horizontal view angle of 30°, an image display element size of 1 cm per side, and a resolution of 800×600 pixels. When the horizontal view angle is increased to 120°, the size of the image display element will be 4 cm per side, and the number of pixels will be 3200×2400.

When the image display element of a head-mounted display device is increased in size and in number of pixels, the following problems occur.

The first problem is that the process of manufacturing the image display element will be complicated, which reduces the yield and increases the cost.

That is, the image display element of a head-mounted display is manufactured by using an exposure device, and it is difficult to expose a large area at high resolution by using an exposure device.

For example, the size of each pixel of the image display element of a head-mounted display is approximately a few micrometers to 20 micrometers. Under the current manufacturing process of semiconductors, only a small area with approximately 1 cm per side can be exposed at high-resolution at a time. Therefore, in order to expose an image display element with 4 cm per side, it is necessary to perform the exposure sixteen times in total. A mask for covering the edge of the panel is also required. In addition, it is sixteen times more likely that a foreign object enters the image display element and causes a dark line of defective pixels or missing dots. This significantly lowers the yield. The complication of the process and the decrease in yield directly lead to the increase in the manufacturing cost of the image display element.

The second problem is that the increase in the number of the pixels of the image display element leads to the increase in the amount of image data during driving.

For example, the amount of image data processed during driving of an image display element having a horizontal view angle of 120° is sixteen times as large as the amount of data processed during driving of an image display element having a horizontal view angle of 30°. If the amount of image data increases, the amount of data to be processed by an image processing circuit, an image transmission circuit and so on also increase, and the drive circuit increases in size accordingly. This hinders the weight reduction of the head-mounted display device. In addition, the increase of the amount of image data results in the increase of the power consumption of the drive circuit.

Considering the above-described problems, the second aspect provides a head-mounted display device that allows the viewer to see a realistic image with an angle of view of at least 30°, and that is manufacturable at a low cost, and that reduces the amount of image data during driving. The head-mounted display device comprises an image display element having the shape of a matrix and displaying an image; an eyepiece magnifying and projecting the image displayed by the image display element; and a holder holding the image display element and the eyepiece to a viewer's head, wherein pixels in a peripheral portion of the image display area of the image display element are greater in size than pixels in a central portion of the image display area.

Considering the resolution characteristics of human eyeballs, a high resolution is required in the range of a narrow angle of view. In the head-mounted display device pertaining to the above-described aspect, the central portion of the screen, which corresponds to the useful visual field, has small pixels, in order to realize a high-definition image and meet the demands for high-resolution.

Similarly, considering the resolution characteristics of human eyeballs, a high resolution is not required at a point corresponding to a wide angle of view. Therefore, although the peripheral portion of the image display element of the head-mounted display device pertaining to the embodiment above has large pixels, the realism is not degraded. By increasing the size of the pixels in the peripheral portion, it is possible to reduce the amount of image data. Therefore, the processing by the drive circuit can be simplified, and the amount of power consumption by the drive circuit can be reduced.

Therefore, the head-mounted display device pertaining to the above-described aspect allows for the use of a simple drive circuit that consumes a smaller amount of power, and allows the viewer to see a realistic image with a wide angle of view.

This advantageous effect can be enhanced by a structure in which the pixels in the central portion of the screen are uniform in size and the pixels in the peripheral portion of the screen are arranged such that a pixel at a greater distance from the central portion of the screen is greater in size.

When the image display element is of a matrix display type having a plurality of scan lines and a plurality of data lines intersecting with each other to form a matrix and one pixel is located at each point of intersection, it is easy to increase the size of the pixels in the peripheral portion of the screen to be greater than the pixels in the central portion of the screen by increasing the intervals between the scan lines and the intervals between the data lines in the peripheral portion of the screen to be greater than in the central portion.

In the above-described image display element, each of the scan lines and the data lines may have a shape of a polygonal line or a curved line so that the size of the pixels can be smoothly changed without deforming the pixels in an unnatural manner.

Regarding the plurality of scan lines and the plurality of data lines, the electrodes in the peripheral portion of the screen can be easily manufactured by forming each line in the peripheral portion of the screen to be thicker than each line in the central portion of the screen.

When the image display element has a plurality of scan lines and a plurality of data lines intersecting with each other to form a matrix and each pixel is composed of a set of sub-pixels of different colors arranged along the scan lines, writing in the central portion of the screen may be performed with respect to sub-pixels at every point of intersection of the scan lines and the data lines, and writing in the peripheral portion of the screen may be performed with respect to sub-pixels at points selected from among a plurality of points of intersection of the scan lines and the data lines. This structure is also effective for increasing the size of the pixels in the peripheral portion of the screen to be greater than the size of the pixels in the central portion of the screen.

In the image display element, when each pixel is composed of a set of sub-pixels of three different colors arranged along the scan lines, the sub-pixels in an area of the peripheral portion of the screen where pixels are twice as large as the pixels in the central portion of the screen may be arranged in a different color order from the sub-pixels in the central portion. With this structure, the writing to sub-pixels of a same color is performed by using a same data line.

In the above-described image display element, respective display surfaces of a left side portion and a right side portion of the image display element may be curved toward the eyepiece away from a plane extending along a display surface of the central portion of the screen. With this structure, the field curvature is eliminated when the eyepiece forms a magnified virtual image, and thus a wide angle of view can be realized.

It is preferable to use a flexible organic EL element as the image display element, in terms of the advantage that a flexible organic EL element is lightweight and easy to process.

<Third Aspect>

In a head-mounted display device comprising: an image display element displaying a two-dimensional image; an eyepiece magnifying and projecting the image displayed by the image display element; and a holder holding the image display element and the eyepiece to a viewer's head, it is also effective for the reduction of the field curvature perceived by the viewer to have a structure in which, in plan view from the viewer, an outline of the image display element includes a straight section and a curved section.

It is also effective for the same to have a structure in which, in plan view from the viewer, an effective diameter of the eyepiece is greater than the image display element.

In plan view from the viewer, the image display element may have a polygonal shape with at least five corners.

The following Embodiments 1 through 9 specifically describe First Aspect through Third Aspect above with reference to the drawings. Note that Embodiments 1 through 3 are mainly related to First Aspect above, Embodiments 4 through 7 are mainly related to Second Aspect above, and Embodiments 8 and 9 are related to Third Aspect above.

Embodiment 1

FIG. 1 shows the structure of a head-mounted display device 1 (hereinafter simply referred to as "display device 1") pertaining to Embodiment 1. In particular, the optical system of the device is shown in this drawing.

The display device 1 includes an optical system including: an image display element 10 for displaying a two-dimensional image; and an eyepiece 20 located in front of the screen of the image display element 10, and magnifies an image displayed by the image display element 10 and projects a virtual image of the image into the air. The display device 1 also includes a holder 30 for holding the optical system and so on in front of the head 100 of the viewer. An eyeball 101 of the viewer sees, through the eyepiece 20, a magnified virtual image 1010 of the image displayed by the image display element 10. In the drawing, the magnified virtual image 1010 is projected to the location near the image display element 10 in order to simplify the drawing. In reality, however, the distance ranges from several centimeters to infinity.

Although FIG. 1 shows only the magnified virtual image 1010 formed by the eyepiece 20 on the right side, a similar magnified virtual image is formed by the eyepiece 20 on the left side.

The image display element 10 is a two-dimensional display device having the shape of a matrix, composed of a central portion 11 which is flat, and a left side portion 12a and a right side portion 12b whose cross-sections along a horizontal plane are curved away from the extension line of the central portion 11 toward the eyepiece 20.

Since the image display element 10 is subject to a bending process to form the above-described shape, it needs to be made from a material that withstands the process. However, the image display element 10 may be made into the curved shape by a single molding process, because it not subject to repeated bending.

Here, it is assumed that the image display element 10 is a thin organic EL display made by forming an organic EL film on a polyimide or PET film. However, it is not necessarily an organic EL display, and any flexible display may be used. For example, an inorganic EL display or a liquid crystal display may be used. Alternatively, a liquid crystal on silicon (LCOS), or a digital mirror device (DMD) may be used.

Figure 4A:
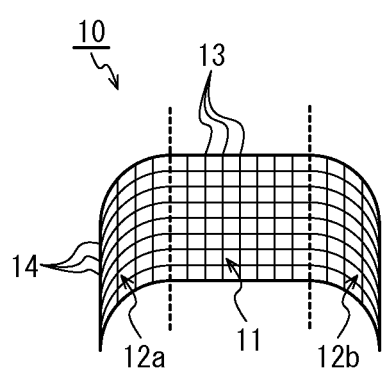
FIGS. 4A and 4B each show an image display element pertaining to an embodiment.

As shown in FIG. 4A, a plurality of data lines 13 and a plurality of scan lines 14 are formed on the image display element 10 so as to intersect with each other. Ends of the plurality of data lines 13 and the plurality of scan lines 14 are connected to drivers (See drive circuits 52 and 53 shown in FIG. 10). The drivers are supplied with image signals and electrical power from the outside the display device 1. In the image display element 10, the drivers sequentially apply voltage to each of the plurality of scan line 14 while supplying image signals to the plurality of data lines 14, and thus the pixels at the intersections of the data lines 13 and the scan lines 14 light up. Consequently, the image display element 10 displays a two-dimensional image.

Specific examples of the shape of the image display element 10 will be described later. The image display element 10 with the curved side portions can be produced by first forming a flat sheet-like display and then bending the side portions by pressing them against a mold having a curved shape.

Alternatively, the side portions may be made into the curved shape by first forming an organic EL film on a glass or silicon substrate to produce a flat image display element, next forming a thick transparent layer on the left and right areas of the surface of the substrate, and then cutting or melting the transparent layer on the left and right areas.

The eyepiece 20 is preferably an aspheric lens or a diffraction lens with a practical view angle of at least 30°.

The display device 1 has a holder 30 having a shape like an eyeglass, which holds the image display element 10 and the eyepiece 20 to the head 100 of the viewer. The holder 30 includes: casings 31 for housing the optical system, temples 32 for holding the casings 31 in front of the head 100, and a frame 33 for holding the eyepieces 20 within the casings 31 respectively.

When the display device 1 is attached to the head 100, the casings 31 are fixed in front of the eyeballs 101 so that the eyepieces 20 and the image display element 10 within the casings 31 are located in front of the eyeballs 101.

(Shape of Image Display Element 10 and Advantageous Effect)

An ideal image plane of a lens is flat. However, a convex lens generally causes "field curvature" and therefore the image plane has a bowl-like curved shape.

Due to the field curvature, when an entirely flat display element is seen through a convex lens, the part of the object out of the angle of view of 30° will be out of focus. In other words, when projecting a magnified virtual image of the image on a flat display, the peripheral area of the screen will be out of focus if the focus is on the central area of the screen, and the central area of the screen will be out of focus if the focus is on the peripheral area of the screen.

In contrast, since the left side portion 12a and the right side portion 12b of the image display element 10 are curved toward the eyepieces 20, the field curvature is eliminated by the side portions 12a and 12b, and a magnified virtual image can be formed over a wide range. This leads to a wide angle of view.

It should be noted here that although the portion of the image display element 10 corresponding to the range of the horizontal view angle of approximately 30° is flat, the field curvature does not have a great effect within this range, because of the use of a single aspheric lens. Within this range, an image is formed on an almost flat plane. The range of the flat area is to be determined according to the practical view angle of the lenses.

With the image display element 10 having the stated structure, both the image from the central portion 11 and the images from the side portions 12a and 12b can be in focus, and a wide angle of view in the horizontal direction can be obtained.

In addition, since the central portion 11 of the image display element 10 is flat, it is unnecessary to apply a bending process to the central portion 11. Compared with the case of applying the bending process to the entire surface, the area to be subject to the bending process is limited, and the stated structure can be easily realized and improves the yield.

As disclosed above, the image display element 10 has a flat central portion 11 corresponding to the range of the angle of view of approximately 30°, and the left side portion 12a and the right side portion 12b each has a curved shape. Therefore, the image display element 10 realizes a wide angle of view, and can be manufactured relatively easily. Furthermore, the angle of view Θ2 in the horizontal direction (i.e. the angle of the view range in the right-to-left direction when the eyeball 101 sees the magnified virtual image 1010) is increased to approximately 120° at the maximum.

Note that since each of the side portions 12a and 12b is located in an area corresponding to a large angle of view in the horizontal direction, they have almost no visual influence even if the images formed by the side portions 12a and 12b are not in sharp focus, because of the visual performance of human eyes as described below.

When the image display element 10 is not curved in the vertical direction, an aspheric lens can correct the field curvature within the range of 30° in the vertical direction, but cannot correct the field curvature outside the range of 30° in the vertical direction. In this regard, however, the outside of the range of 30° in the vertical direction corresponds to the outside of the useful visual field. Therefore, even if images outside the range of 30° are not in perfect focus, they have almost no visual influence, because of the visual performance of human eyes as described below.

The following describes the reason why the side portions 12a and 12b and the outside of the range of 30° in the vertical direction have almost no visual influence.

(Visual Performance of Human Eyes and its Consideration)

Figure 2:
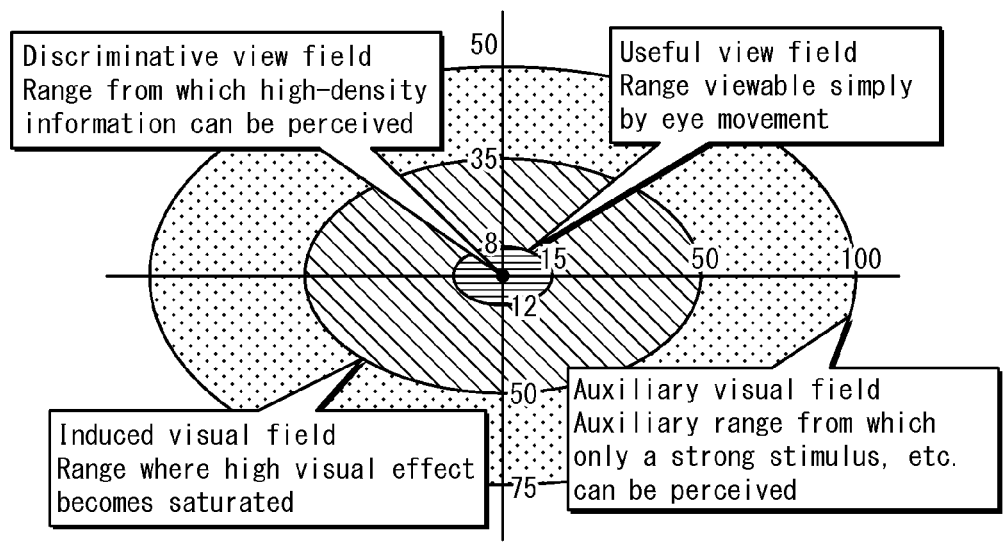
FIG. 2 shows information perception characteristics within the field of view of a human.

FIG. 2 shows human characteristics with respect to perception of information within the field of view ("Kourinjoukan djisupurei", Kyoritsu Shuppan Co., Ltd., edited by Chizuka TANI, p. 61).

As shown in FIG. 2, the field of view of a human can be divided broadly into four fields. The four fields are: discriminative view field (within a few degrees), achieving the most superior visual performance such as the visual acuity and the ability of discrimination between colors; effective view field (left and right ranges: within approximately 15°; upper range: within approximately 8°; lower range: within approximately 12°), which can perceive the object solely by eye movement; induced visual field (horizontal range: 30° to 100°; vertical range: 20° to 85°), which can recognize only a presented object, and has an influence on the spatial cognition by a human; and auxiliary visual field (horizontal range: 100° to 200°, vertical range: 85° to 135°), which has an extremely low ability to perceive a presented object, and only has a function to induce eye movement in response to a strong stimulus.

Figure 3:
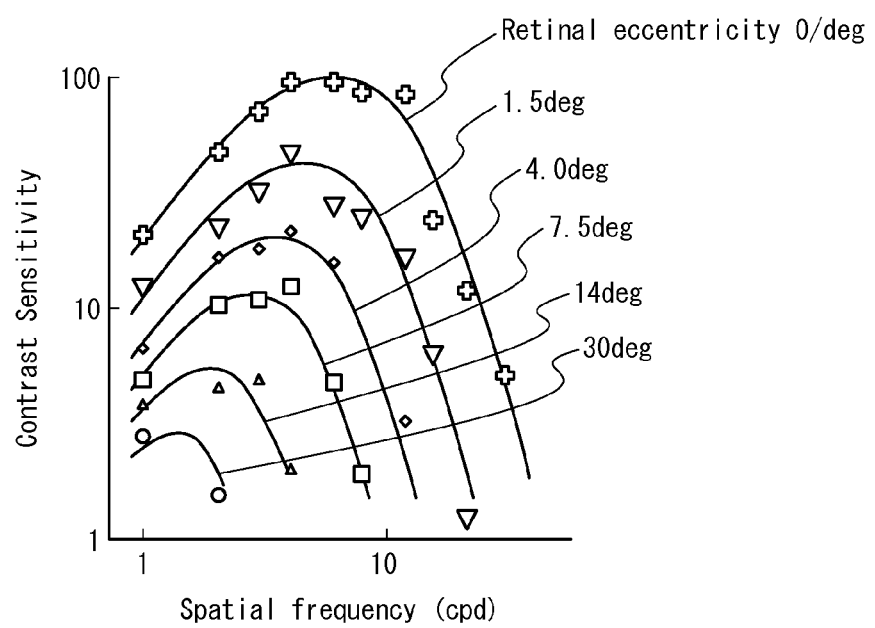
FIG. 3 shows resolution characteristics of nose-side positions on a human eyeball along the horizontal direction.

FIG. 3 shows resolution characteristics of nose-side positions on a human eyeball along the horizontal direction ("Ningen keisoku hando bukku", Asakura Publishing Co., Ltd., edited by National Institute of Advanced Industrial Science and Technology, Institute for Human Science and Biomedical Engineering, p. 169).

The center point (0°) of the field of view of a human has a high spatial frequency. At the center point, even a stripe pattern with low contrast can be visually recognized. However, the maximum spatial frequency decreases to a half when the angle with respect to the center point increases to only 1.5°. When the angle with respect to the center point increases to 30°, the limit of visually recognizable resolution decreases to approximately one twentieth.

Resolution characteristics of nose-side positions along the vertical direction are similar to the characteristics shown in FIG. 3.

FIGS. 2 and 3 show that high-definition images are required for the useful visual field where the object can be perceived solely by eye movement, and images that are not high-definition are acceptable for the outside of the useful visual field.

The figures also show that the useful visual field in the horizontal direction is 10° wider than the useful visual field in the vertical direction.

Considering the characteristics of the field of view shown in FIGS. 2 and 3, the visual resolution characteristics are degraded as the angle of view in the horizontal direction is increased from 30°, and therefore, even if images outside the range of 30° are not in perfect focus, they have almost no visual influence.

In addition, since the area of the image display element 10 outside the vertical view angle of 20° (+8°, −12°) corresponds to the outside of the useful visual field, there is no practical problem even if the field curvature in this area is not corrected.

Therefore, when the eyepiece has a practical view angle of approximately 20°, it is possible to realize a desirable useful visual field by bending the image display element 10 only with respect to the horizontal direction.

Here, note that the image display element 10 needs to have an appropriate flat area. This is because, if the image display element 10 is not provided with a flat area, the central portion, which is curved with respect to the horizontal direction, but not curved with respect to the vertical direction, cannot form an image in focus, because the lens characteristics are symmetrical. Meanwhile, when the flat area of the image display element 10 is too large, a large optical system is required for correction of the field curvature.

As explained above, it can be said that the image display element 10 has a shape reflecting the result of the consideration of the optical characteristics of an eyepiece and the visual performance of human eyes.

The above consideration also shows that it is preferable that boundaries between the central portion 11 and the side portions 12a and 12b of the image display element 10 are determined such that the view angle Θ1 of the boundaries between the central portion 1011 and the side portions 1012a and 1012b of the magnified virtual image 1010 is set within the range of approximately 20° to 30° according to the practical view angle of the eyepiece.

Note, however, that the angle of view changes depending on the eye relief. Also, the boundaries between the central portion and the left and right side portions may vary for each product. Therefore, it is preferable that a boundary between the central portion and the left side portion and a boundary between the central portion and the right side portion are located within a range of 10° to 40° (±5° to 20°) in terms of an angle of view in a horizontal direction.

The curvature or the angle of bend of the side portions 12a and 12b is determined to be appropriate for correcting the field curvature.

The curvature R of the side portions 12a and 12b is determined with reference to, for example, the product of the refractive index n and the focal length f of the eyepiece 20.

Usually, it is preferable that the curvature R of the side portions 12a and 12b be set to be within the range of 10 mm to 30 mm.

As described above, the display device 1 utilizes a curved thin display as the image display element 10, and a single lens as the eyepiece 20, thereby realizing the view angle of 30° (±15° despite its small size and light weight.

In this regard, the eyepieces of the head-mounted display device disclosed Patent Literature 2 utilize a relay lens or an image fiber plate in order to realize a view angle of 30° (±15° or greater and to allow the viewer to see a clear, flat image even at the periphery of the image. Therefore, the optical system becomes large and heavy, and needs to be manufactured with a high accuracy.

In contrast, the display device 1 according to the present embodiment does not need a relay lens or an image fiber plate. Therefore, it can be small and lightweight. Furthermore, it can be easily manufactured by bending a flexible display.

(Configuration of Image Display Element 10)

The image display element 10 may be formed in various configurations as shown in FIGS. 4A and 4B and FIGS. 5A, 5B and 5C.

The following describes the variations of the configuration of the image display element 10.

1. The image display element 10 shown in FIG. 4A is formed from a rectangular flexible display. The central portion 11 is kept flat, and the side portions 12a and 12b are curved with respect to the horizontal direction so as to have a cylindrical shape.

Figure 4B:
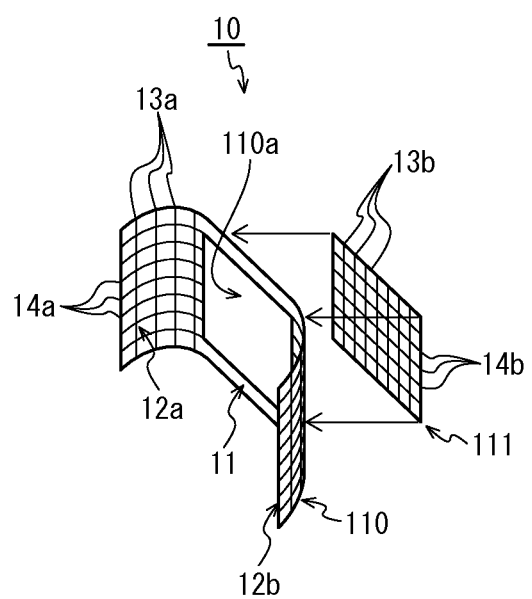

2. The image display element 10 shown in FIG. 4B is formed from a rectangular flexible display 110. The central portion of the display 110 is kept flat, and a transparent area 110a is formed thereon. The side portions 12a and 12b are curved with respect to the horizontal direction so as to have a cylindrical shape. No pixels are formed in the transparent area 110a, and a flat image display element 111 is disposed on the rear side of the transparent area 110a.

In this image display element 10, an image displayed by the image display element 111 is seen through the transparent area 110a, and the side portions 12a and 12b show an image displayed by the display 110. The flexible display 110 is thin, and therefore the level difference occurring between the display surface of the image display element 111 and the display surfaces of the side portions 12a and 12b are small and not noticeable.

In this way, the central portion 11 and the side portions 12a and 12b may be formed from separate displays.

If this is the case, the flexible display 110 and the image display element 111 can be separately manufactured in the manufacturing process, and the image display element can be assembled from these displays. Therefore, this structure improves the yield.

The base material of the display 110 is a flexible transparent film. The transparent base material may exist within the transparent area 110a, or have an opening. The transparent area 110a is preferably designed to have a similar size as the image display area of the image display element 111 so that the outside of the image display area will be unseeable.

According to the characteristics of the field of view shown in FIGS. 2 and 3, the side portions 12a and 12b of the display 110 do not need to display a high-definition image. Therefore, it is preferable to provide only a small number of pixels on these portions to reduce the amount of data to be processed during the driving and the power consumption. Meanwhile, it is preferable that the image display element 111 on the central portion can display a high-definition image. Therefore, the central portion of the image display element 111 may be made up by forming a high-definition EL element on a silicon substrate or a glass substrate so that the central portion can realize a higher resolution than the side portions 12a and 12b of the display 110.

In the example shown in FIG. 4B, the image display element 111 may have a large thickness, because the flat image display element 111 is formed on the rear side of the flexible display 110. When the flat image display element 111 has a small thickness, the image display element 111 may be formed on the front side of the flexible display 110.

3. The image display elements 10 shown in FIGS. 4A and 4B have a curved shape composed of smooth curves extending from the edges of the central portion 11 to the side portions 12a and 12b. However, angular bends may be formed between the central portion 11 and the side portions 12a and 12b.

FIG. 5A shows a flexible display with angular bends formed at the locations corresponding to the angle of 30° in the horizontal direction.

In the example shown in FIG. 5A, the left and right side portions 12a and 12b as well as the central portion 11 are flat, and it is therefore difficult to focus compared to a display whose side portions 12a and 12b are curved. However, since the side portions 12a and 12b are bent toward the eyepiece 20 away from the plane extending along the central portion 11, this example achieves the effect of correcting the field curvature.

In the example shown in FIG. 5A, the left and right side portions 12a and 12b are flat, and it is therefore difficult to focus compared to a display whose side portions 12a and 12b are curved. However, since the visual resolution characteristics degrade as the angle of view in the horizontal direction is increased from 30°, no practical problem occurs.

The display shown in FIG. 5A may be formed by bending a single flexible display, or by tiling three displays corresponding to the central portion 11 and the left and right side portions 12a and 12b.

4. The image display element 10 shown in FIG. 5B is formed by arranging a rhombus-shaped flexible display such that the corners indicated by hollow arrows are located at top, bottom, left and right, and curving the corners.

The central portion 11 is flat, the left and right side portions 12a and 12b (left and right corners) are curved, and the top portion 11a and the bottom portion 11b (top and bottom corners) of the central portion 11 are curved as well.

Such a configuration, where the top, bottom, left and right corners are curved, is preferable because it can correct the field curvature not only in the horizontal direction but also in the vertical direction.

5. The image display element 10 shown in FIG. 5C is formed by folding a rectangular flexible display along the center line so as to form two flat portions 11c and 11d in the central portion 11, and furthermore bending the corners indicated by the hollow arrows.

Compared to an image display element having an entirely flat shape, such a configuration is advantageous in terms of the reduction of the distortion in the horizontal and vertical direction.

6. The image display element 10 shown in FIG. 5D and FIG. 5E has a flat hexagonal central portion 11 in the middle, and a trapezoidal side portion 12 radially extends from each of the six sides of the hexagonal central portion 11. The central portion 11 is flat, and each side portion is curved as shown in FIG. 5E.

FIG. 5D shows an exploded view of the image display element 10, and FIG. 5E shows a plan view and a side view.

In the exploded view shown in FIG. 5D, the six side portions 12 are separated from each other. However, as shown in FIG. 5E, the adjacent side portions 12 in the curved state are connected with each other.

It is preferable that a transparent filler or a lens is formed at the joints between the side portions 12 to make the joints less noticeable.

The side portions 12 each curved in one of six directions reduces the distortion in the six directions.

The central portion 11 may have an octagonal shape, and a trapezoid side portions 12 may be radially extends from each of the eight sides. If this is the case, it can reduce the distortion in the eight directions.

7. In the image display element 10, it is preferable that the central portion 11 is more high definition than the side portions 12.

Embodiment 2

Figure 6:
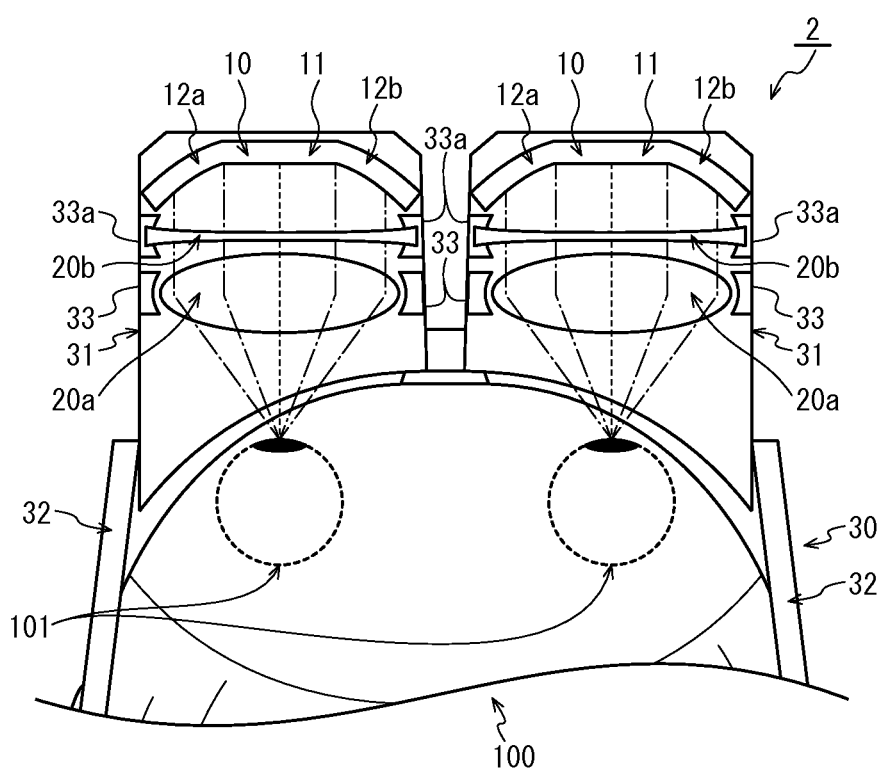
FIG. 6 shows the structure of an image display device 2 pertaining to Embodiment 2.

FIG. 6 shows the structure of a head-mounted display device 2 pertaining to Embodiment 2.

The display device 2 has a similar structure to the display device as described above except that the eyepieces are not single lenses, and each eyepiece is composed of two lenses, namely a lens 20a for magnify and projecting an image displayed on the image display element 10 and a lens 20b for correction.

The lens 20b is not only used for correction of various kinds of aberration, but may also be used for correction of the visual acuity of each individual viewer. Therefore, the frame 33a supporting the lens 20b for correction is detachable. For example, the frame 33a is configured such that the lens 20b can be removed from the frame 33a by moving a frame support bar.

For example, the display device 1 pertaining to Embodiment 1 can correct myopia and hyperopia to a some extent by changing the positional relationship between the image display element 10 and the eyepieces 20. However, the display device 1 pertaining to Embodiment 1 cannot correct astigmatism. In contrast, the display device 2 can correct astigmatism by adjusting the secondary lenses, namely the lenses 20b.

In the display device 2, the secondary lenses 20b are located outside the lenses 20a, and therefore the lenses 20b can be relatively easily replaced with other lenses.

The lenses 20a are heavy because they need high magnification (e.g. 10 times), whereas the lenses 20b are light because they are used for correction and do not need high magnification. In the display device 2, the lenses 20b, which are relatively lightweight, are located outside. This brings a preferable balance to the display device 2 when attached to the head 100.

Embodiment 3

Figure 7:
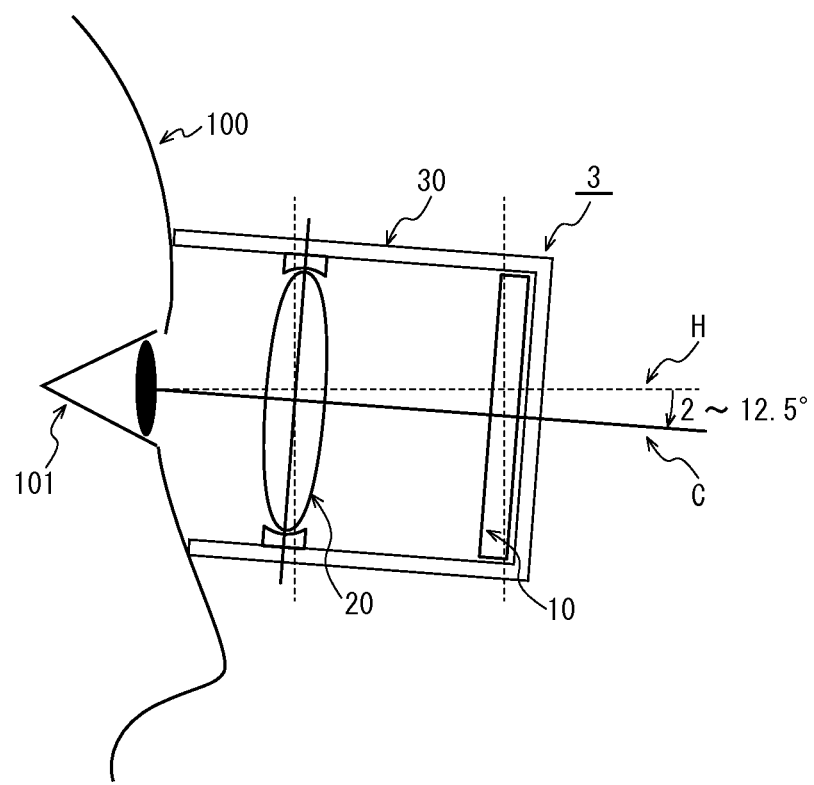
FIG. 7 shows the structure of a display device 3 pertaining to Embodiment 3.
Figure 8:
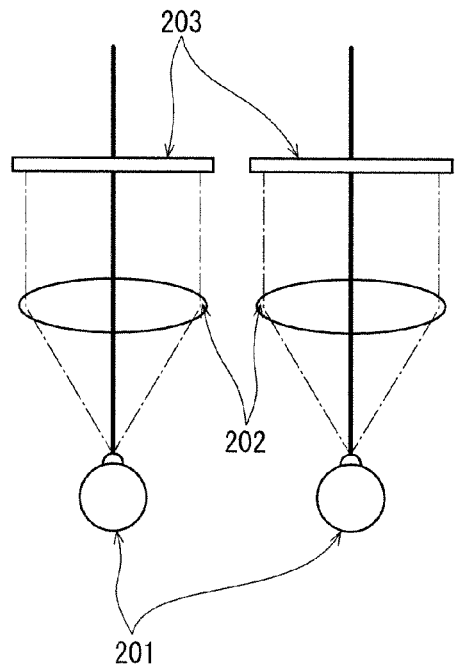
FIG. 8 shows the structure of a head-mounted display device pertaining to conventional technology.
Figure 9:
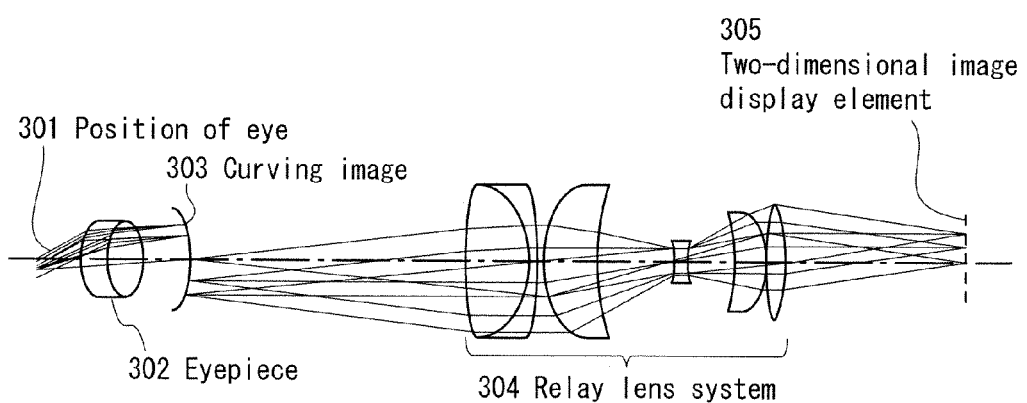
FIG. 9 shows the structure of an optical system using a relay lens disclosed in Patent Literature 1.

FIG. 7 shows the structure of a head-mounted display device 3 pertaining to Embodiment 3.

The display device 3 has a similar structure to the display device 1 except that the axis C of the optical system of the display device 3 is slanted downward with respect to the horizontal visual line H.

The horizontal visual line H represents a line that the viewer who is standing feels as being horizontal.

The following explains the effect obtained by slanting the optical system of the display device 3 downward.

In the human characteristics with respect to perception of information within the field of view shown in FIG. 2, the left range and the right range of the field of view of a human in the horizontal direction are equal, but the upper range and the lower range in the vertical direction are not equal. Specifically, within the useful visual field (i.e. the field covered by eye movement), the upper range is 8° and the lower range is 12°. Within the induced visual field, the upper range is 35° and the lower range is 50°. Within the auxiliary visual field, the upper range is 50° and the lower range is 75°.

In contrast, the characteristics of the eyepieces 20 are basically symmetrical with respect to the optical axis.

Therefore, the upper range and the lower ranges of the angle of view in can be equalized in terms of the vertical direction by slanting the axis of the optical system downward by 2° to 12.5° such that the axis of the useful visual field will be close to the axis C.

In addition, since the center of gravity of the display device 3 is lowered by slanting the axis of the optical system, such a configuration provides a better fit.

Note that even better fit can be achieved by configuring the display device 3 such that the weight of the device will be supported at the cheeks on the head 100. In addition, the same advantageous effect can be obtained with the display device 2 pertaining to Embodiment 2 by slanting the axis of the optical system thereof downward.

Embodiment 4

A display device 1 pertaining to Embodiment 4 has the same structure as the Embodiment 1 shown in FIG. 1, and includes an optical system including: an image display element 10 for displaying a two-dimensional image; and an eyepiece 20 located in front of the screen of the image display element 10, and magnifies an image displayed by the image display element 10 and projects a virtual image of the image into the air. The display device 1 also includes a holder 30 for holding the optical system and so on in front of the head 100 of the viewer. An eyeball 101 of the viewer sees a magnified virtual image 1010 of the image displayed on the image display element 10 through the eyepiece 20.

The image display element 10 is a two-dimensional display device having the shape of a matrix. Although the image display element may have an entirely flat sheet-like shape, the example shown in FIG. 1 has a flat central portion 11 corresponding to the angle Θ1 of view, and a left side portion 12a and a right side portion 12b whose cross-sections along a horizontal plane are curved away from the extension line of the central portion 11 toward the eyepiece 20.

In the image display element 10, it is usually preferable that the curvature R of the side portions 12a and 12b be determined within the range of 10 mm to 30 mm. It is preferable that boundaries between the central portion 11 and the side portions 12a and 12b are determined such that the view angle Θ corresponding to the range from the boundary between the central portion 1011 and the left side portion 1012a of the magnified virtual image 1010 to the boundary between the central portion 1011 and the right side portion 1012b of the magnified virtual image 1010 will be approximately 30°.

The curved shapes of the left and right side portions 12a and 12b eliminate the field curvature when the eyepieces 20 form the magnified virtual image 1010. Therefore, a magnified virtual image is formed over a wide area of the left and right side portions 12a and 12b. Therefore, the angle Θ2 of view in the horizontal direction can be increased.

When the image display element 10 is subject to a bending process, it needs to be made from a material that withstands the process. However, the image display element 10 may be made into the curved shape by a single molding process, because it is not repeatedly subject to the bending.

Although it is preferable that the image display element 10 is a thin organic EL display made by forming an organic EL film on a polyimide or PET film, it is not necessarily an organic EL display, and an inorganic EL display or a liquid crystal display may be used.

Figure 10:
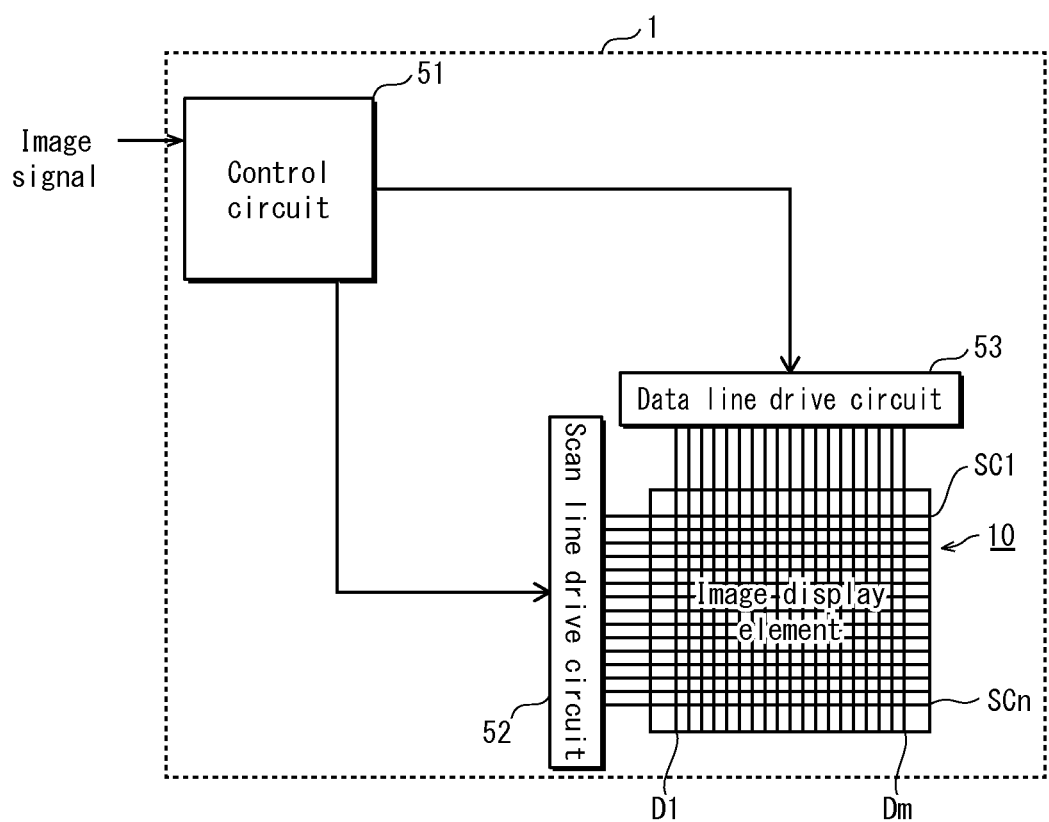
FIG. 10 is a block diagram showing the arrangement of electrodes and the structure of a drive circuit of an image display element 10.

FIG. 10 is a block diagram showing the arrangement of electrodes and the structure of a drive circuit of the image display element 10.

For simplification, the explanation is based on the assumption that one pixel is composed of one EL element. However, the same explanation is true when one pixel is composed of three EL elements of R, G, and B.

As shown in FIG. 10, the image display element 10 has scan lines SC1 through SCn each corresponding to a pixel row, and data lines D1 through Dm each corresponding to a pixel column. n×m pixels are formed at the intersections of the scan lines, SC1 through SCn, and the data lines, D1 through Dm, in the shape of a matrix. To write a gradation value in each pixel, a pixel circuit including one selection transistor is formed for each pixel. Each selection transistor is connected to the scan line SC and the data line D.

To drive the image display element 10, the display device 1 is provided with a control circuit 51, a scan line drive circuit 52 and a data line drive circuit 53.

The scan line drive circuit 52 is connected to the plurality of scan lines SC1 through SCn, and outputs scan voltage, which is for selecting the row to which a gradation value is to be written, to the plurality of scan lines SC1 through SCn.

The data line drive circuit 53 is connected to the data lines D1 through Dm, and outputs data voltage corresponding to the image signal to the column selected by the scan line drive circuit 52 from among the plurality of data lines D1 through Dm.

Consequently, the image display element 10 displays an image by lighting the pixels at the intersections of the scan lines SC1 through SCn and the data lines D1 through Dm according to the image signal.

The size of the pixels of the image display element 10 is small in the central portion of the display area and large in the peripheral portion of the display area. Specific examples will be described later.

The image display element 10 may be entirely flat. In this example, however, the central portion 11 is flat, and the left and right side portions 12a and 12b are curved away from the extension line of the central portion 11 toward the eyepiece 20. In other words, the cross-sections of the left side portion 12a and the right side portion 12b along a horizontal plane are curved away from the extension line of the central portion 11 toward the eyepiece 20.

The eyepiece 20 is preferably an aspheric lens or a diffraction lens with a practical view angle of at least 30°.

The display device 1 has a holder 30 like an eyeglass frame, which holds the image display element 10 and the eyepiece 20 and is attachable to the head 100 of the viewer. The holder 30 includes: a casing 31 for housing the optical system, temples 32 for holding the casing 31 in front of the head 100, and a frame 33 for holding the eyepieces 20 within the casing 31.

When the display device 1 is attached to the head 100, the casings 31 are fixed in front of the eyeballs 101 so that the eyepieces 20 and the image display element 10 within the casings 31 are located in front of the eyeballs 101.

(Arrangement of Electrodes of Image Display Element 10)

Figure 11:
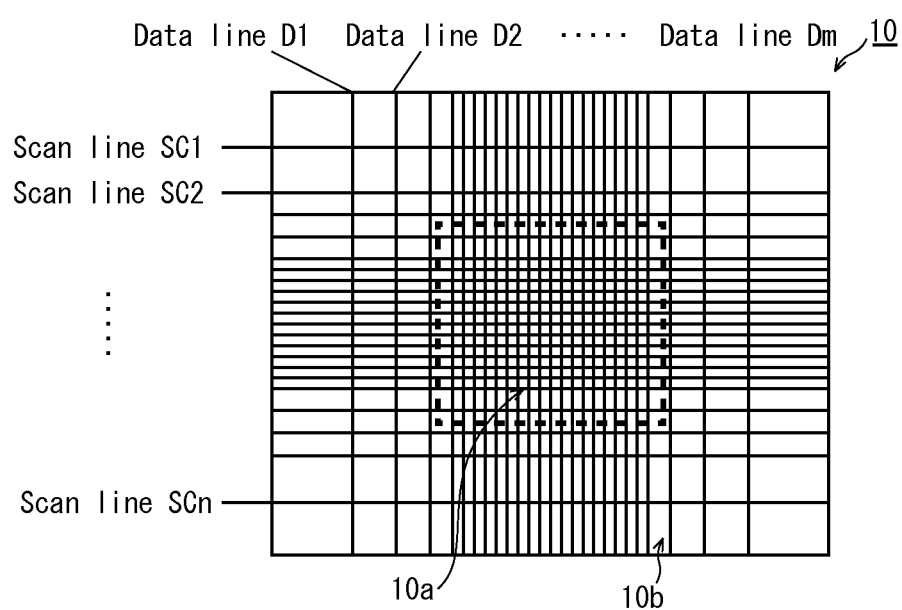
FIG. 11 shows an example arrangement of electrodes of an image display element 10 pertaining to Embodiment 4.

FIG. 11 shows an example arrangement of the electrodes of the image display element 10.

As shown in FIG. 11, the intervals between the scan lines SC and the intervals between the data lines D are both constant within the central portion 10a (within the dotted line) of the screen of the image display element 10, whereas the intervals between the scan lines SC and the intervals between the data lines D in the peripheral portion 10b (outside the dotted line) are both larger than within the central portion 10a.

The vertical length of each pixel corresponds to the interval between the scan lines SC, and the horizontal length of each pixel corresponds to the interval between the data lines. Therefore, the pixel size in the central portion 10a of the screen is larger than in the peripheral portion 10b of the screen.

As seen from the human characteristics with respect to perception of information within the field of view, this configuration with respect to the pixel size are based on the fact that the useful visual field (left and right ranges: within approximately 15°; upper range: within approximately 8°; lower range: within approximately 12°) requires high definition image, but the level of the requirement decreases according to the increase in the distance from the useful visual field.

Here, it is preferable that the size of the central portion 10a of the screen is set to the size corresponding to the range of the useful visual field. Alternatively, the horizontal length of the central portion 10a of the screen may be set to match the horizontal length of the central portion 11.

For example, the range of the image display element 10 falling within the useful visual field has a length of 1 cm in the horizontal direction and 0.7 cm in the vertical direction. It is preferable that the central portion 10a of the screen is set within the useful visual field and the electrodes within the central portion 10a are arranged with constant intervals so that the central portion 10a can display a high-definition, high-resolution image.

In the example shown in FIG. 11, both the intervals between the scan lines SC and the intervals between the data lines D increase within the peripheral area 10b of the screen according to the increase in the distance from the range of the useful visual field.

For example, with reference to the intervals between the scan lines SC and the intervals between the data lines D within the useful visual field, the intervals between the scan lines SC and the intervals between the data lines D within an area at a distance corresponding to a view angle of 1.5° from the useful visual field are doubled. Similarly, the intervals between the scan lines SC and the intervals between the data lines D within an area at a distance corresponding to a view angle of 30° from the useful visual field are twenty times, and the intervals between the scan lines SC and the intervals between the data lines D within an area at a distance corresponding to a view angle of greater than 30° from the useful visual field are even larger.

In the peripheral portion 10b of the screen, the widths of the scan lines SC and the data lines D may be increased according to the increase in the intervals between the scan lines SC and the intervals between the data lines D, compared to the central portion 10a of the screen.

The arrangement of the electrodes described above achieves the following effects.

First, the arrangement simplifies the manufacturing process of the image display element 10 compared to when the pixels within the central portion 10a and the peripheral portion 10b of the screen are formed to be high-definition equally, because the number of pixels in the peripheral portion 10b is small.

The manufacturing process of the image display element 10 includes exposure for patterning the electrodes and the layers of the element. In the case of high-definition exposure, the area to be exposed is small. Compared to the case of exposing the entire screen with a high-definition exposure device, the frequency of the exposure to be performed can be reduced by, for example, exposing the central portion 10a of the screen with a high-definition exposure device that exposes a small area, and exposing the peripheral portion 10b of the screen with a non-high-definition exposure device that exposes a large area. Thus, the stated arrangement can simplify the manufacturing process of the image display element.

When an image display element is manufactured to be high-definition, it is likely that a foreign object enters the image display element and causes a dark line of defective pixels or missing dots. The stated arrangement, however, prevents the occurrence of a dark line or missing dots during the manufacturing process, because the peripheral portion 10b of the screen is not high-definition. Due to the simplification of the process and the improvement in the yield, the image display element 10 can be manufactured at a low cost.

This effect can be enhanced by increasing the widths of the electrodes in the peripheral portion 10b of the screen as well as the intervals between the electrodes.

Second, since the pixel size in the peripheral portion 10b of the screen is large and the number of the pixels is small compared to the case of manufacturing the entire screen to be high-definition, the amount of the image data to be processed by the control circuit 51, the scan line drive circuit 52 and the data line drive circuit 53 during the driving is smaller in the image display element 10. The amount of the image data is almost inversely proportional to the pixel size. For example, in the area where the pixel size is increased to four times, the amount of the image data is reduced to one fourth.

The image processing circuit and the image transmission circuit can be simplified by reducing the amount of the image data to be processed during the driving. Therefore, the stated structure reduces the size and the weight of the device as a whole.

In addition, since the aperture ratio can be improved by increasing the pixel size in the peripheral portion 10b of the screen, the stated arrangement improves the luminous efficiency. The stated arrangement accordingly increases the luminous efficiency of the entire image display element 10, and reduces the power consumption.

Furthermore, by reducing the amount of the image data within the peripheral portion 10b of the screen, the power consumption of the image processing circuit and the image transmission circuit can be reduced.

These effects can be additionally enhanced by increasing the intervals between the scan lines SC and the intervals between the data lines D as the distance from the useful visual field increases.

(Visual Performance of Human Eyes and its Consideration)

As described in Embodiment 1 above with reference to FIG. 2, the field of view of a human can be divided broadly into four fields. Also, as described with reference to FIG. 3, the center point (0°) of the field of view of a human has a high spatial frequency, where a human can visually recognize even a stripe pattern with low contrast. The maximum spatial frequency decreases to a half as the angle from the center point increases to 1.5°. When the angle from the center point increases to 30°, the visually recognizable resolution decreases to approximately one twentieth. Resolution characteristics of each nose-side vertical position have a similar tendency.

Therefore, that high-definition images are required by the useful visual field, which can perceive the object solely by eye movement, and images that are not high-definition are acceptable for the outside of the useful visual field. Also, the useful visual field in the horizontal direction is 10° wider than the useful visual field in the vertical direction.

Considering the characteristics of the field of view shown in FIGS. 2 and 3, the visual resolution characteristics degrade as the angle of view in the horizontal direction is increased from 30°, and therefore, even if the pixels outside the range of 30° are large, they have almost no visual influence.

Furthermore, since the range outside the view angle of 20° in the vertical direction is outside the useful visual field, there is no visual influence even if the pixels of the image display element 10 in this range are large.

As explained above, it can be said that the stated arrangement of the electrodes in the image display element 10 is based on the visual performance of human eyes, and that the state structure allows the viewer to see realistic images and has an effect of reducing the amount of the image data during the driving.

Embodiment 5

Figure 12A:
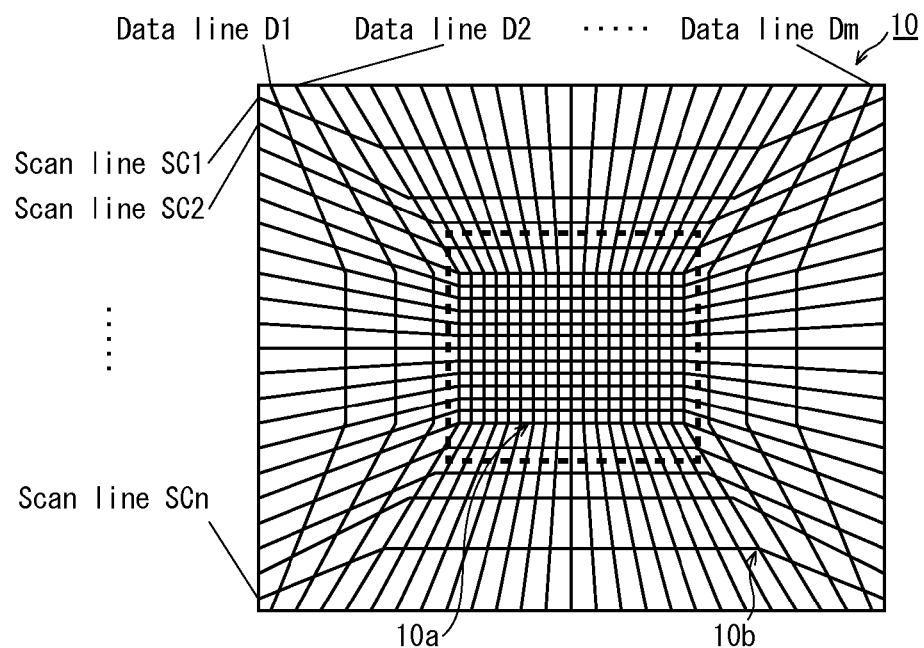
FIGS. 12A and 12B each show an example arrangement of electrodes of an image display element 10 pertaining to Embodiment 5.
Figure 12B:
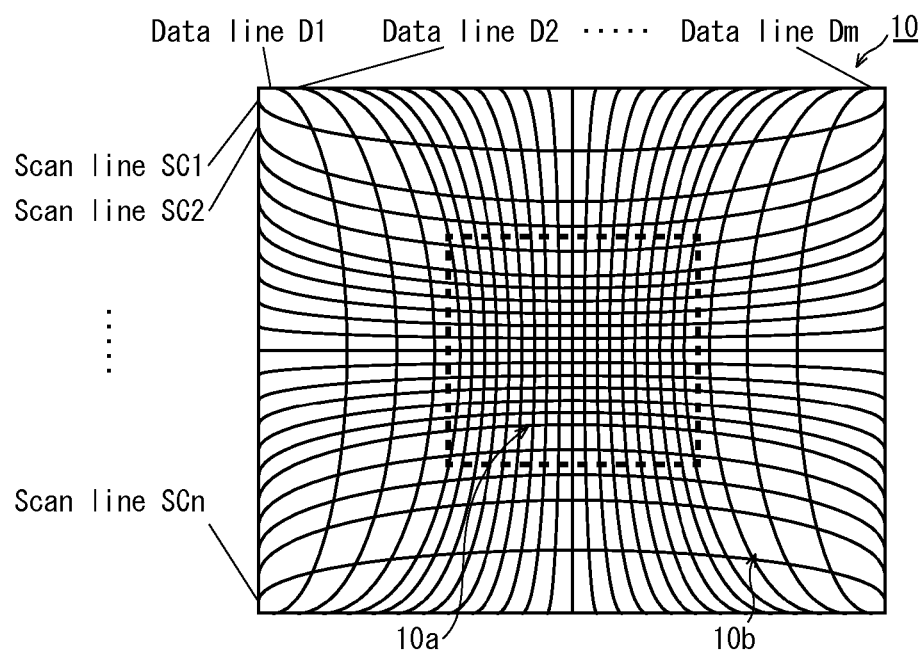

FIGS. 12A and 12B each show an arrangement of the electrodes of an image display element 10 pertaining to Embodiment 5.

The display device pertaining to the present embodiment is similar to the display device 1 pertaining to Embodiment 4, including the features of the image display element 10 that the intervals between the scan lines SC and the intervals between the data lines D are greater in the peripheral portion 10b of the screen than in the central portion 10a of the screen, and the pixel size is larger in the peripheral portion 10b than in the central portion 10a. The difference lies in the shapes of the scan lines SC and the data lines on the image display element 10.

In the image display element 10 shown in FIG. 12A, the scan lines SC1 through SCn and the data lines D1 through Dm are respectively arranged at almost constant intervals in the central portion 10a of the screen. In the peripheral portion 10b of the screen, however, each of the electrodes extends along a polygonal line so that the intervals between the electrodes increase.

In the image display element 10 shown in FIG. 12B, the scan lines SC1 through SCn and the data lines D1 through Dm are each arranged in a curved line such that the intervals between the electrodes are greater at a point closer to the periphery of the screen.

Alternatively, each of the scan lines SC1 through SCn and the data lines D1 through Dm may be arranged in a step-like pattern composed of short line segments such that the intervals between the electrodes are greater at a point closer to the periphery of the screen.

In addition to the advantageous effects of Embodiment 4 described above, the present embodiment has an advantage that the pixel size in the peripheral portion 10b of the screen is smoothly changed without deforming the pixels in an unnatural manner, as described below.

In the case of the display device 1 shown in FIG. 11, the intervals of the electrodes in the peripheral portion 10b of the screen is particularly small in the areas on the top and bottom sides and the right and the left sides of the central portion 10a of the screen. In the areas on the top and bottom sides of the central portion 10a, the pixels are elongated in the vertical direction, and in the areas on the left and right sides of the central portion 10a, the pixels are elongated in the horizontal direction. Furthermore, when the pixels are vertically or horizontally elongated in such a manner, exposure needs to be performed with a high accuracy to form the pixel circuit. Consequently, the manufacturing process would be complicated, and it is likely that the yield is lowered by entrance of a foreign object.

In contrast, the image display element 10 pertaining to the present embodiment is not extremely elongated in the vertical or horizontal direction, and therefore such a problem is not likely to occur.

In addition, in the image display element 10 pertaining to the present embodiment, the intervals between the pixels gradually increase according the distance from the center of the screen in a natural manner. Therefore, the change in the intervals between the pixels is not noticeable.

Embodiment 6

The display device pertaining to the present embodiment is similar to the display device 1 pertaining to Embodiment 4, including the features of the image display element 10 that the intervals between the scan lines SC and the intervals between the data lines D are greater in the peripheral portion 10b of the screen than in the central portion 10a of the screen, and the pixel size is larger in the peripheral portion 10b than in the central portion 10a. The difference lies in the arrangement of the electrodes and the pixels.

Figure 13:
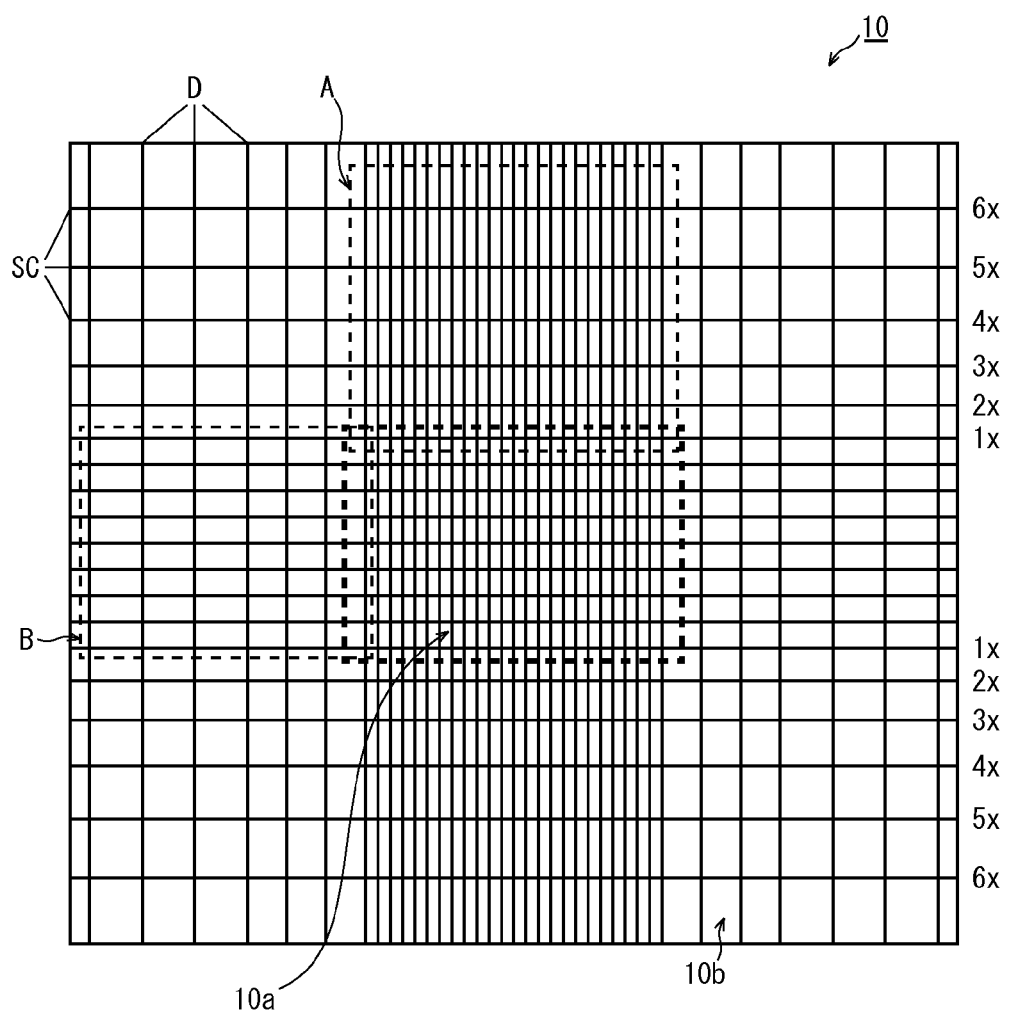
FIG. 13 shows an example arrangement of electrodes of an image display element 10 pertaining to Embodiment 6.
Figure 14:
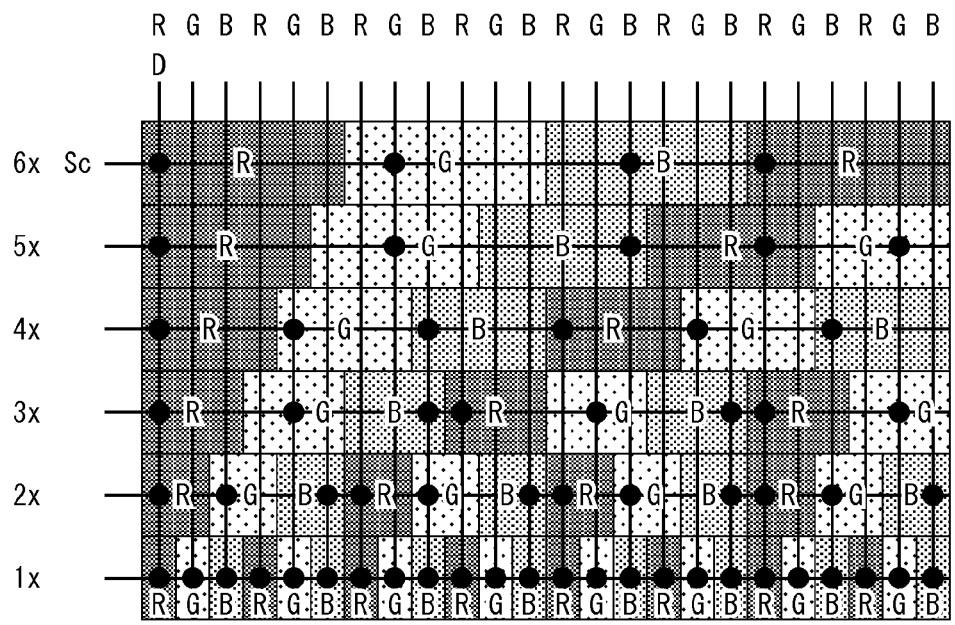
FIG. 14 shows the arrangement of the electrodes and the pixels surrounded by dotted line A in FIG. 13.

FIG. 13 shows the arrangement of the electrodes of the image display element 10 pertaining to Embodiment 6, and FIG. 14 shows the arrangement of the electrodes and the pixels surrounded by the dotted line A shown in FIG. 13.

In FIGS. 13 and 14, one pixel is composed of three sub-pixels (EL elements) of R, G and B colors, which are adjacent to each other in the horizontal direction.

When the size of each sub-pixel in the central portion 10a of the screen is defined as a reference size (i.e. 1×), the size in the horizontal direction of each sub-pixel in the peripheral portion 10b of the screen is 2×, 3×, . . . , or 6× as large as the reference size according to the distance from the central portion 10a of the screen. Since the size of each sub-pixel in the peripheral portion 10b of the screen is 2×, 3×, . . . , or 6× as large, the size of each pixel is 2×, 3×, . . . , or 6× as large, accordingly.

The plurality of scan electrodes SC and the plurality of data electrodes D each have a straight shape. In the example shown in FIG. 13, the intervals between the scan electrodes SC and the intervals between the data electrodes D are greater in the peripheral portion 10b of the screen than in the central portion 10a.

Regardless of the size of the sub-pixels, one selection transistor and one pixel circuit are provided in each sub-pixel.

The following provides more specific explanation with reference to FIG. 14. A selection transistor and a pixel circuit, which are for writing a gradation value in each of the R, G and B sub-pixels, are provided at each intersection indicated by the sign "●".

Regarding the sub-pixels (1×) in the central portion 10a of the screen, an R, G, or B sub-pixel is formed at every intersection of the plurality of scan electrodes SC and the plurality of data electrodes D in the shape of a matrix, and each sub-pixel is provided with a selection transistor and a pixel circuit, which are for writing a gradation value in the sub-pixel.

In the peripheral portion 10b of the screen, the size of the sub-pixels is from twice to six times as large as the reference size, and there are two or more intersections of the scan electrodes SC and the data electrodes D within each sub-pixel. However, the selection transistor and the pixel circuit are provided at only one of these intersections.

For example, regarding the 6× sub-pixels in the peripheral portion 10b of the screen, there are six intersections of the scan lines SC and the data lines D contained in one sub-pixel, and the selection transistor and the pixel circuit are provided at one of these intersections. That is, a single selection transistor performs the writing to the 6× size sub-pixel.

Such an image display element 10 achieves the following advantageous effects as explained in Embodiment 4. First, since the size of the sub-pixels in the peripheral portion 10b of the screen is larger compared to when the sub-pixels in the central portion 10a and the peripheral portion 10b are uniformly formed to be high-definition, the manufacturing of the image display element 10 is easy. Second, since the number of the sub-pixels in the peripheral portion 10b of the screen of the image display element 10 is smaller than when the entire screen is formed to be high-definition, the amount of the image data to be processed by the drive circuit during the driving is reduced. Furthermore, a large light-emitting area is secured in the sub-pixels within the peripheral portion 10b the screen.

Moreover, according to the present embodiment, there is no restriction on the configuration of the peripheral portion 10b of the screen, that is, it is not necessary to form a sub-pixel at every intersection of the scan lines SC and the data lines D. Therefore, the size of the sub-pixels can be determined relatively freely, and it is possible to drastically reduce the number of the pixels.

In the examples shown in FIGS. 13 and 14, the size of the sub-pixels in the central portion 10a of the screen is defined as a reference size (i.e. 1x), and the size of each sub-pixel in the peripheral portion 10b of the screen is twice to six times as large as the reference size. However, these numeric values are not essential, and the multiplication ratios may be set to any integers. However, considering the visual performance of human eyes, it is preferable that the size of the sub-pixels gradually increases according to the distance from the useful visual field.

In particular, it is preferable to set the size of the sub-pixels close to the central portion 10a of the screen to be twice as large as the reference size, because these sub-pixels are close to the useful visual field and noticeable.

In the area surrounded by the dotted line B shown in FIG. 13, i.e., in the left and right side portions of the peripheral portion 10b of the screen, the size of the sub-pixels is increased by increasing the intervals between the data electrodes D and providing only one selection transistor for the plurality of scan electrodes SC.

Note that both the intervals between the scan electrodes SC and the intervals between the data electrodes D may be uniform in the entire screen.

Embodiment 7

The present embodiment is similar to Embodiment 6 described above. The difference lies only in the order of R, G and B in the row of the 2× size sub-pixels of the image display element 10.

That is, in the above-described image display element 10 shown in FIG. 14, the sub-pixels are arranged in the order of R, G and B in every pixel. If this is the case, however, the data line used for the writing to the blue sub-pixel in the 1× sub-pixel row cannot be used for the writing to the blue sub-pixel in the 2× sub-pixel row, and the data line used for the writing to the green sub-pixel in the 1× sub-pixel row cannot be used for the writing to the green sub-pixel in the 2× sub-pixel row. Therefore, the data line used for the writing to the blue sub-pixel in the 1× sub-pixel row is used for the writing to the green sub-pixel in the 2× sub-pixel row, and the data line used for the writing to the green sub-pixel in the 1× sub-pixel row is used for the writing to the blue sub-pixel in the 2× sub-pixel row. If a single data line is used for the writing to sub-pixels of different colors, the processing of image signals applied by the data line drive circuit 53 to each data line will be complicated.

Figure 15:
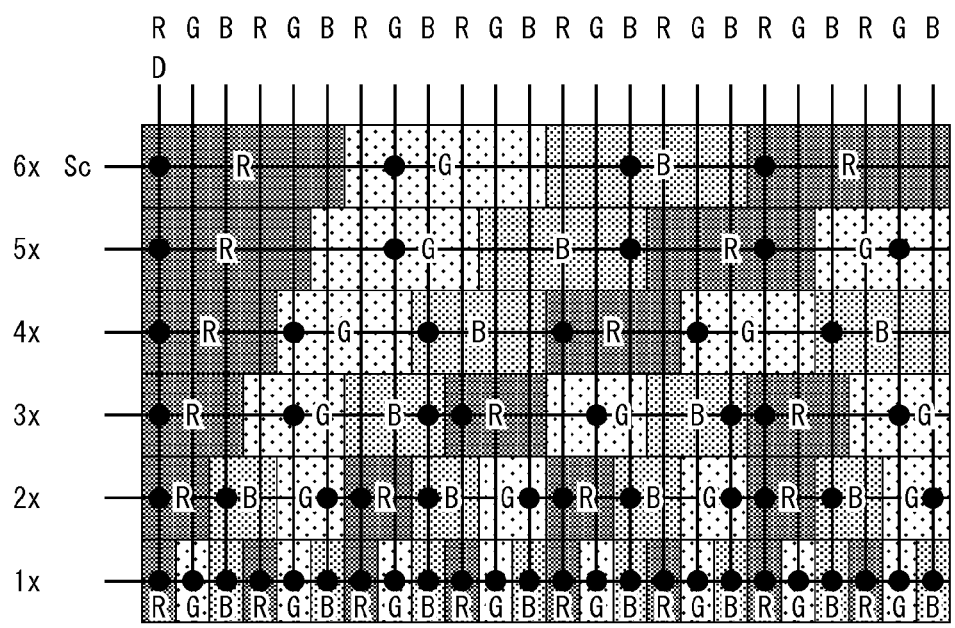
FIG. 15 shows the arrangement of electrodes and pixels of an image display element 10 pertaining to Embodiment 7.

In contrast, as shown in FIG. 15, in the image display element 10 pertaining to the present embodiment, the sub-pixels in the rows other than the 2× sub-pixel row (i.e., 1×, 3×, 4×, 5× and 6× sub-pixel rows) are arranged in the order of R, G and B from left to right, whereas the sub-pixels in the 2× sub-pixel row are arranged in the order of R, B and G from left to right. With this structure, the same data line can be used for the writing to the 1× sub-pixel and the 2× sub-pixel of the same color. Thus, the stated structure simplifies the processing of the image signals applied by the data line drive circuit 53 to each data line.

In the example shown in FIG. 15, the red sub-pixel is determined as a reference pixel, and the order of the green and blue sub-pixels is reversed. However, the green sub-pixel may be determined as a reference pixel, and the order of the red and blue sub-pixels may be reversed. Similarly, the blue sub-pixel may be determined as a reference pixel, and the order of the red and green sub-pixels may be reversed.

Embodiment 8

A display device pertaining to the present embodiment is similar to the display devices pertaining to Embodiments 1 through 7 described above. However, as shown in FIG. 16A, the size of the image display element 10 is smaller than the effective diameter of the eyepiece 20, and, as shown in FIG. 16C, the four corners of the effective screen of the image display element 10 are rounded and therefore the outline of the image display element 10 is composed of straight sections and curved sections.

This structure reduces the influence of the distortion of the lens, and allows the viewer to feel the realism and a sense of immersion, as described below.

Figure 16A:
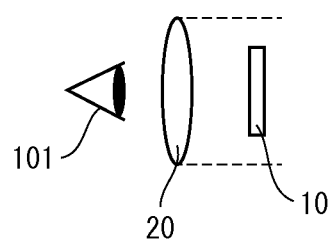
FIGS. 16A through 16C each show an image display element pertaining to Embodiment 8.
Figure 16B:
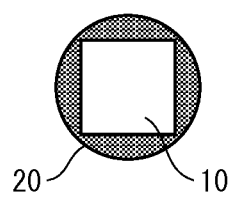
Figure 16C:
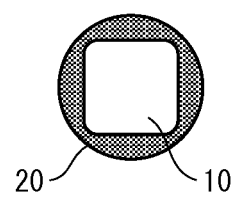

When the size of the image display element 10 is smaller than the effective diameter of the eyepiece 20 as shown in FIG. 16A, if the image display element 10 has the shape of a rectangular with angular four corners, the viewer sees a virtual image of the image display element 10 through the eyepiece 20, as shown in FIG. 16B.

The virtual image of the image display element 10 seen through the eyepiece 20 also has the shape of a rectangular, which has four angular corners. If this is the case, the following problems occur.

The first problem is that more accurate aberration correction is required because the effective screen of the image display element has a rectangular shape and the distortion of the lens is emphasized. Since humans have acute sensitivity to geometric shapes, a viewer presuming that each of the four corners of the virtual image should be at a right angle is likely to recognize barrel distortions or pincushion distortions.

The second problem is that the effective screen of the image display element having a rectangular shape prevents the viewer from feeling the realism or a sense of immersion. This is because the rectangular shape of the effective screen of the image display element makes the viewer feel like seeing an image through a huge screen or a huge window, and the viewer therefore cannot feel as if he/she is inside the virtual space. Even if the edges of the effective screen are located outside the auxiliary field of view, the viewer can recognize a rectangular shape with high contrast.

In contrast, as shown in FIG. 16C, the image display element 10 pertaining to the present embodiment has an effective screen with four rounded corners. That is, in plan view from the viewer, the outline of the image display element 10 does not have angular corners, and is composed of straight sections and curved sections.

Therefore, noticeable distortion at the four corners of the effective screen is reduced.

The four corners of the effective screen of the image display element 10 may be rounded by image signal processing, or covering the four corners with a black frame for light shielding. Alternatively, the outline of the effective screen of the image display element 10 itself may be formed to have a curved shape.

Although the basic shape of the image display element 10 is a rectangular shape, this is not essential.

For example, even when the image display element 10 has a polygonal shape with at least five corners, the same effect can be achieved by rounding the corners. In addition, the same effect can be achieved even when the outline of the image display element 10 has a shape without a straight segment, such as a circular shape.

Embodiment 9

Figure 17A:
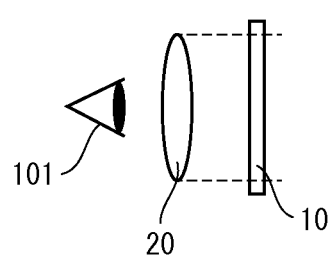
FIGS. 17A through 17C each show an image display element pertaining to Embodiment 9.

A display device pertaining to the present embodiment is similar to the display devices explained in Embodiments 1 through 7. As shown in FIG. 17A, the difference lies in that, in plan view from the viewer, the size of the image display element 10 is greater than the effective diameter of the eyepiece 20.

Figure 17B:
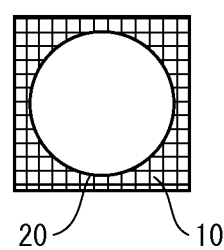

With this structure, as shown in FIG. 17B, the viewer cannot see the horizontal or vertical edges of the screen of the image display element 10 through the eyepiece 20, let along the four corners. Therefore, this structure greatly reduces the influence of the distortion of the lens.

When the image display element 10 has a rectangular shape as shown in FIG. 17B, the area outside the eyepiece 20 in plan view from the viewer (i.e., the area of the image display element 10 that the viewer cannot see through the eyepiece 20) is likely to be large. In such a case, it is likely that the image display element 10 becomes unnecessarily large and the holder becomes heavy.

Figure 17C:
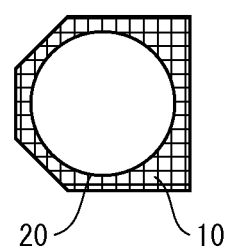

Considering this, it is possible to reduce the area of the image display element 10 outside the eyepiece 20 in plan view from the viewer by forming the image display element 10 in a polygonal shape with at least five corners as shown in FIG. 17C. This structure reduces the size of the image display element 10.

In addition, the image display element 10 may be formed in a polygonal shape, and the corners may be rounded. Alternatively, the image display element 10 may be formed in a circular shape having no straight section. These structures further reduce the area of the image display element 10 outside the eyepiece 20.

(Modifications, etc.)

In the display device pertaining to the embodiments described above, a transmissive lens optical system such as an aspheric lens or a diffractive lens is used as the eyepiece 20. Alternatively, however, a concave mirror optical system using a concave mirror, an eccentric free-form surface optical system using a free-form surface prism, or a see-through display optical system using a holographic optical element (HOE) or the like may be used. Even in these cases, an aberration occurs in the optical system without exception. Therefore, the same advantageous effects can be achieved by combining any of the image display elements 10 described in Embodiments above with the optical system.

Moreover, any of the display devices 10 described in Embodiments above may be adopted in a front projector or a rear projector. This achieves the same advantageous effects.

INDUSTRIAL APPLICABILITY

The present invention provides a lightweight head-mounted display device with a wide angle of view, and is useful as an image display device for televisions, computers, and game machines. The present invention is also applicable to viewfinders.

REFERENCE SIGNS LIST 1-3 head-mounted display device
10 image display element
10a central portion of screen
10b peripheral portion of screen
11 central portion
11a top portion
11b bottom portion
12 side portion
12a left side portion
12b right side portion
13 data line
14 scan line
20 eyepiece
20a lens
20b lens
30 holder
31 casing
32 temple
33 frame
33a frame
51 control circuit
52 scan line drive circuit
53 data line drive circuit
SC scan line
D data line
100 head
101 eyeball
110 flexible display
110a transparent area
111 image display element
1010 magnified virtual image

The invention claimed is:

1. A head-mounted display device comprising:
an image display element displaying a two-dimensional image;
a first eyepiece and a second eyepiece, each magnifying and projecting the image displayed by the image display element; and
a holder holding the image display element, the first eyepiece, and the second eyepiece to a viewer's head, wherein
the image display element is composed of:
a first central portion having a flat display surface visible via a central portion of the first eyepiece and a second central portion having a flat display surface visible via a central portion of the second eyepiece, the first central portion and the second central portion being aligned along a common plane; and
a first portion disposed between the first central portion and the second central portion, a second portion disposed at a side of the first central portion that is opposite a side of the first central portion at which the first portion is disposed, and a third portion disposed at a side of the second central portion that is opposite a side of the second central portion at which the first portion is disposed, a first half of the first portion having a display surface that is curved toward the first eyepiece away from the plane, a second half of the first portion having a display surface that is curved toward the second eyepiece away from the plane, the second portion having a display surface that is curved toward the first eyepiece away from the plane, and the third portion having a display surface that is curved toward the second eyepiece away from the plane.

2. The head-mounted display device of claim 1, wherein a boundary between the first central portion and the second portion and a boundary between the second central portion and the third portion are located within a range of 10° to 40° in terms of an angle of view in a horizontal direction.

3. The head-mounted display device of claim 1, wherein a boundary between the first central portion and the second portion and a boundary between the second central portion and the third portion are located within a range of 20° to 30° in terms of an angle of view in a horizontal direction.

4. The head-mounted display device of claim 1, wherein each of the left side second portion and the third portion has a sheet-like shape, and cross-sections thereof along a horizontal plane are curved toward the first eyepiece and the second eyepiece, respectively, away from the plane extending along the first central portion and the second central portion.

5. The head-mounted display device of claim 1, wherein:
the image display element has a rectangular sheet-like shape, and
two corners of the image display element, which are located at top left and bottom left of the image display element, are curved toward the first eyepiece away from the plane, and two other corners of the image display element, which are located at top right and bottom right of the image display element, are curved toward the second eyepiece away from the plane.

6. The head-mounted display device of claim 1, wherein:
the first eyepiece and the second eyepiece are each is composed of a plurality of lenses, and
the holder holds at least one of the lenses detachably.

7. A head-mounted display device comprising:
an image display element displaying a two-dimensional image;
a first eyepiece and a second eyepiece, each magnifying and projecting the image displayed by the image display element; and
a holder holding the image display element, the first eyepiece, and the second eyepiece to a viewer's head, wherein
the image display element is composed of:
a first central portion having a flat display surface visible via a central portion of the first eyepiece and a second central portion having a flat display surface visible via a central portion of the second eyepiece, the first central portion and the second central portion being aligned along a common plane; and
a first peripheral portion disposed around a periphery of the first central portion and a second peripheral portion disposed around the second central portion, the first peripheral portion being curved toward the first eyepiece away from the plane and the second peripheral portion being curved toward the second eyepiece away from the plane.

8. The head-mounted display device of claim 7, wherein pixels in the peripheral portion are greater in size than pixels in the central portion.

9. A head-mounted display device comprising:
an image display element displaying a two-dimensional image;
an eyepiece located in front of a screen of the image display element and forming a virtual image by magnifying the image displayed by the image display element; and
a holder holding the image display element and the eyepiece to a viewer's head,
wherein the image display element has a plurality of scan lines and a plurality of data lines intersecting with each other to form a matrix, and one pixel is located at each point of intersection,
pixels in a peripheral portion of the screen are greater in size than pixels in a central portion of the screen,
intervals between the scan lines and intervals between the data lines are greater in the peripheral portion of the screen than in the central portion of the screen, and
width of the scan lines and width of the data lines increase as the intervals between the scan lines and the intervals between the data lines increase.

10. The head-mounted display device of claim 9, wherein in the image display element, each of the scan lines and the data lines has a shape of a polygonal line.

11. The head-mounted display device of claim 9, wherein in the image display element, each of the scan lines and the data lines has a shape of a curved line.

12. The head-mounted display device of claim 9, wherein:
each pixel is composed of a set of sub-pixels of different colors arranged along the scan lines,
in the central portion of the screen, writing is performed with respect to sub-pixels at every point of intersection of the scan lines and the data lines, and
in the peripheral portion of the screen, writing is performed with respect to sub-pixels at points selected from among a plurality of points of intersection of the scan lines and the data lines.

13. The head-mounted display device of claim 9, wherein respective display surfaces of a left side portion and a right side portion of the image display element are curved toward the eyepiece away from a plane extending along a display surface of the central portion of the screen.

14. The head-mounted display device of claim 9, wherein:
the pixels in the central portion of the screen are uniform in size, and
the pixels in the peripheral portion of the screen are arranged such that a pixel at a greater distance from the central portion of the screen is greater in size.

15. The head-mounted display device of claim 14, wherein:
each pixel is composed of a set of sub-pixels of three different colors arranged along the scan lines,
in an area of the peripheral portion of the screen where pixels are twice as large as the pixels in the central portion of the screen, the sub-pixels are arranged in a different color order from the sub-pixels in the central portion.

16. A head-mounted display device comprising:
an image display element displaying a two-dimensional image;
an eyepiece magnifying and projecting the image displayed by the image display element; and
a holder holding the image display element and the eyepiece to a viewer's head,
wherein in plan view from the viewer, an outline of the image display element includes a straight section and a curved section
the image display element has a plurality of scan lines and a plurality of data lines intersecting with each other to form a matrix, and one pixel is located at each point of intersection,
pixels in a peripheral portion of the screen are greater in size than pixels in a central portion of the screen,
intervals between the scan lines and intervals between the data lines are greater in the peripheral portion of the screen than in the central portion of the screen, and
width of the scan lines and width of the data lines increase as the intervals between the scan lines and the intervals between the data lines increase.

17. The head-mounted display device of claim 16, wherein in plan view from the viewer, an effective area of the eyepiece encompasses the image display element.

18. A head-mounted display device comprising:
an image display element displaying a two-dimensional image;
an eyepiece magnifying and projecting the image displayed by the image display element; and
a holder holding the image display element and the eyepiece to a viewer's head,
wherein in plan view from the viewer, the image display element encompasses an effective area of the eyepiece
the image display element has a plurality of scan lines and a plurality of data lines intersecting with each other to form a matrix, and one pixel is located at each point of intersection, pixels in a peripheral portion of the screen are greater in size than pixels in a central portion of the screen, intervals between the scan lines and intervals between the data lines are greater in the peripheral portion of the screen than in the central portion of the screen, and width of the scan lines and width of the data lines increase as the intervals between the scan lines and the intervals between the data lines increase.

19. The head-mounted display device of claim 18, wherein in plan view from the viewer, the image display element has a polygonal shape with at least five corners.

* * * * *